United States Patent
Tam et al.

(10) Patent No.: US 9,201,627 B2
(45) Date of Patent: Dec. 1, 2015

(54) SYSTEMS AND METHODS FOR TRANSFERRING CONTENT BETWEEN USER EQUIPMENT AND A WIRELESS COMMUNICATIONS DEVICE

(75) Inventors: Terry Tam, Kowloon (HK); Jerry So, Tseung Kwan O (HK); Dick Wong, Kowloon (HK)

(73) Assignee: Rovi Guides, Inc., Santa Clara, CA (US)

( * ) Notice: Subject to any disclaimer, the term of this patent is extended or adjusted under 35 U.S.C. 154(b) by 927 days.

(21) Appl. No.: 12/652,572

(22) Filed: Jan. 5, 2010

(65) Prior Publication Data

US 2011/0163939 A1  Jul. 7, 2011

(51) Int. Cl.
*H04N 21/41* (2011.01)
*G06F 3/14* (2006.01)
*H04N 21/414* (2011.01)
*H04N 21/647* (2011.01)
*H04N 21/422* (2011.01)

(52) U.S. Cl.
CPC .......... *G06F 3/1454* (2013.01); *H04N 21/4126* (2013.01); *H04N 21/41407* (2013.01); *H04N 21/42221* (2013.01); *H04N 21/64707* (2013.01)

(58) Field of Classification Search
CPC ..................... H04N 21/4126; H04N 21/41407; H04N 21/64707; H04N 21/42221; G06F 3/1454
See application file for complete search history.

(56) References Cited

U.S. PATENT DOCUMENTS

| | | |
|---|---|---|
| 4,429,385 A | 1/1984 | Cichelli et al. |
| 4,625,080 A | 11/1986 | Scott |
| 4,706,121 A | 11/1987 | Young |
| 4,751,578 A | 6/1988 | Reiter |
| 4,761,684 A | 8/1988 | Clark et al. |
| 4,787,063 A | 11/1988 | Muguet |
| 4,908,707 A | 3/1990 | Kinghorn |
| 5,036,314 A | 7/1991 | Barillari et al. |
| 5,089,885 A | 2/1992 | Clark |
| 5,113,259 A | 5/1992 | Romesburg et al. |
| 5,132,992 A | 7/1992 | Yurt et al. |
| 5,155,591 A | 10/1992 | Wachob |
| 5,223,924 A | 6/1993 | Strubbe |
| 5,233,423 A | 8/1993 | Jernigan et al. |
| 5,253,066 A | 10/1993 | Vogel |
| 5,335,277 A | 8/1994 | Harvey et al. |
| 5,353,121 A | 10/1994 | Young et al. |

(Continued)

FOREIGN PATENT DOCUMENTS

| | | |
|---|---|---|
| DE | 3151492 | 7/1983 |
| DE | 19531121 | 2/1997 |

(Continued)

OTHER PUBLICATIONS

International Search Report for PCT/US2011/020112 dated Jul. 4, 2011.

(Continued)

Primary Examiner — Pinkal R Chokshi
(74) Attorney, Agent, or Firm — Ropes & Gray LLP

(57) ABSTRACT

A wireless communications device provides users with opportunities to access interactive media guidance or other applications and to control user equipment and interactive media guidance applications. In an exemplary embodiment, if the wireless communications device goes outside of a predetermined range from the user equipment, content that was playing on user equipment may automatically be streamed to the wireless communications device.

21 Claims, 19 Drawing Sheets

(56) References Cited

U.S. PATENT DOCUMENTS

| | | |
|---|---|---|
| 5,359,367 A | 10/1994 | Stockill |
| 5,382,983 A | 1/1995 | Kwoh et al. |
| 5,410,326 A | 4/1995 | Goldstein |
| 5,414,756 A | 5/1995 | Levine |
| 5,455,570 A | 10/1995 | Cook et al. |
| 5,465,113 A | 11/1995 | Gilboy |
| 5,469,206 A | 11/1995 | Strubbe et al. |
| 5,479,266 A | 12/1995 | Young et al. |
| 5,479,268 A | 12/1995 | Young et al. |
| 5,481,296 A | 1/1996 | Cragun et al. |
| 5,483,278 A | 1/1996 | Strubbe et al. |
| 5,502,504 A | 3/1996 | Marshall et al. |
| 5,509,908 A | 4/1996 | Hillstead et al. |
| 5,523,796 A | 6/1996 | Marshall et al. |
| 5,524,195 A | 6/1996 | Clanton, III et al. |
| 5,526,034 A | 6/1996 | Hoarty et al. |
| 5,528,304 A | 6/1996 | Cherrick et al. |
| 5,534,911 A | 7/1996 | Levitan |
| 5,550,576 A | 8/1996 | Klosterman |
| 5,557,338 A | 9/1996 | Maze et al. |
| 5,559,548 A | 9/1996 | Davis et al. |
| 5,559,549 A | 9/1996 | Hendricks et al. |
| 5,559,550 A | 9/1996 | Mankovitz |
| 5,570,295 A | 10/1996 | Isenberg et al. |
| 5,572,442 A | 11/1996 | Schulhof et al. |
| 5,579,239 A | 11/1996 | Freeman et al. |
| 5,583,560 A | 12/1996 | Florin et al. |
| 5,585,838 A | 12/1996 | Lawler et al. |
| 5,585,865 A | 12/1996 | Amano et al. |
| 5,589,892 A | 12/1996 | Knee et al. |
| 5,592,551 A | 1/1997 | Lett et al. |
| 5,594,509 A | 1/1997 | Florin et al. |
| 5,596,373 A | 1/1997 | White et al. |
| 5,600,364 A | 2/1997 | Hendricks et al. |
| 5,606,374 A | 2/1997 | Bertram |
| 5,617,526 A | 4/1997 | Oran et al. |
| 5,619,249 A | 4/1997 | Billock et al. |
| 5,621,456 A | 4/1997 | Florin et al. |
| 5,623,613 A | 4/1997 | Rowe et al. |
| 5,629,733 A | 5/1997 | Youman et al. |
| 5,630,119 A | 5/1997 | Aristides et al. |
| 5,631,995 A | 5/1997 | Weissensteiner et al. |
| 5,635,978 A | 6/1997 | Alten et al. |
| 5,635,979 A | 6/1997 | Kostreski et al. |
| 5,640,484 A | 6/1997 | Mankovitz |
| 5,654,748 A | 8/1997 | Matthews et al. |
| 5,657,072 A | 8/1997 | Aristides et al. |
| 5,666,293 A | 9/1997 | Metz et al. |
| 5,673,089 A | 9/1997 | Yuen et al. |
| 5,675,390 A | 10/1997 | Schindler et al. |
| 5,682,206 A | 10/1997 | Wehmeyer et al. |
| 5,692,214 A | 11/1997 | Levine |
| 5,694,163 A | 12/1997 | Harrison |
| 5,699,107 A | 12/1997 | Lawler et al. |
| 5,710,601 A | 1/1998 | Marshall et al. |
| 5,734,853 A | 3/1998 | Hendricks et al. |
| 5,734,893 A | 3/1998 | Li et al. |
| 5,748,191 A | 5/1998 | Rozak et al. |
| 5,748,716 A | 5/1998 | Levine |
| 5,758,257 A | 5/1998 | Herz et al. |
| 5,758,259 A | 5/1998 | Lawler |
| 5,781,246 A | 7/1998 | Alten et al. |
| 5,787,259 A | 7/1998 | Haroun et al. |
| 5,788,507 A | 8/1998 | Redford et al. |
| 5,790,202 A | 8/1998 | Kummer et al. |
| 5,793,964 A | 8/1998 | Rogers et al. |
| 5,798,785 A | 8/1998 | Hendricks et al. |
| 5,812,931 A | 9/1998 | Yuen |
| 5,828,420 A | 10/1998 | Marshall et al. |
| 5,844,620 A | 12/1998 | Coleman et al. |
| 5,850,218 A | 12/1998 | LaJoie et al. |
| 5,858,866 A | 1/1999 | Berry et al. |
| 5,867,233 A | 2/1999 | Tanaka et al. |
| 5,880,768 A | 3/1999 | Lemmons et al. |
| 5,886,732 A | 3/1999 | Humpleman |
| 5,886,746 A | 3/1999 | Yuen et al. |
| 5,907,323 A | 5/1999 | Lawler et al. |
| 5,914,746 A | 6/1999 | Matthews, III et al. |
| 5,977,964 A | 11/1999 | Williams et al. |
| 5,986,650 A | 11/1999 | Ellis et al. |
| 5,988,078 A | 11/1999 | Levine |
| 6,002,394 A | 12/1999 | Schein et al. |
| 6,014,184 A | 1/2000 | Knee et al. |
| 6,016,141 A | 1/2000 | Knudson et al. |
| 6,097,441 A | 8/2000 | Allport |
| 6,104,334 A | 8/2000 | Allport |
| 6,130,726 A | 10/2000 | Darbee et al. |
| 6,169,543 B1 | 1/2001 | Wehmeyer |
| 6,177,931 B1 | 1/2001 | Alexander et al. |
| 6,208,384 B1 | 3/2001 | Schultheiss |
| 6,226,444 B1 | 5/2001 | Goldschmidt Iki et al. |
| 6,226,618 B1 | 5/2001 | Downs et al. |
| 6,233,734 B1 | 5/2001 | Macrae et al. |
| 6,239,794 B1 | 5/2001 | Yuen et al. |
| 6,263,501 B1 | 7/2001 | Schein et al. |
| 6,263,503 B1 | 7/2001 | Margulis |
| 6,268,849 B1 | 7/2001 | Boyer et al. |
| 6,310,886 B1 | 10/2001 | Barton |
| 6,324,338 B1 | 11/2001 | Wood et al. |
| 6,331,877 B1 | 12/2001 | Bennington et al. |
| 6,354,378 B1 | 3/2002 | Patel |
| 6,357,043 B1 | 3/2002 | Ellis et al. |
| 6,418,556 B1 | 7/2002 | Bennington et al. |
| 6,463,585 B1 | 10/2002 | Hendricks et al. |
| 6,522,342 B1 | 2/2003 | Gagnon et al. |
| 6,536,041 B1 | 3/2003 | Knudson et al. |
| 6,564,378 B1 | 5/2003 | Satterfield |
| 6,611,654 B1 | 8/2003 | Shteyn |
| 6,614,987 B1 | 9/2003 | Ismail et al. |
| 6,651,253 B2 | 11/2003 | Dudkiewicz et al. |
| 6,756,997 B1 | 6/2004 | Ward, III et al. |
| 6,760,412 B1 | 7/2004 | Loucks |
| 6,760,537 B2 | 7/2004 | Mankovitz |
| 6,813,775 B1 | 11/2004 | Finseth et al. |
| 6,813,777 B1 | 11/2004 | Weinberger et al. |
| 6,837,789 B2 | 1/2005 | Garahi et al. |
| 6,868,225 B1 | 3/2005 | Brown et al. |
| 6,897,904 B2 | 5/2005 | Potrebic et al. |
| 6,950,624 B2 | 9/2005 | Kim et al. |
| 7,003,791 B2 | 2/2006 | Mizutani |
| 7,013,478 B1 | 3/2006 | Hendricks et al. |
| 7,020,704 B1 | 3/2006 | Lipscomb et al. |
| 7,055,166 B1 | 5/2006 | Logan et al. |
| 7,088,952 B1 | 8/2006 | Saito et al. |
| 7,134,130 B1 | 11/2006 | Thomas |
| 7,165,098 B1 | 1/2007 | Boyer et al. |
| 7,200,852 B1 | 4/2007 | Block |
| 7,206,892 B2 | 4/2007 | Kim et al. |
| 7,213,089 B2 | 5/2007 | Hatakenaka |
| 7,224,889 B2 | 5/2007 | Takasu et al. |
| 7,268,833 B2 | 9/2007 | Park et al. |
| 7,296,284 B1 | 11/2007 | Price et al. |
| 7,344,084 B2 | 3/2008 | DaCosta |
| 7,386,871 B1 | 6/2008 | Knudson et al. |
| 7,428,744 B1 | 9/2008 | Ritter et al. |
| 7,458,093 B2 | 11/2008 | Dukes et al. |
| 7,518,503 B2 * | 4/2009 | Peele ...................... 340/539.11 |
| 7,603,685 B2 | 10/2009 | Knudson et al. |
| 7,689,556 B2 | 3/2010 | Garg et al. |
| 7,783,632 B2 | 8/2010 | Richardson et al. |
| 7,852,416 B2 * | 12/2010 | Bennett et al. ................. 348/734 |
| 7,907,213 B1 | 3/2011 | Biere et al. |
| 8,060,399 B2 * | 11/2011 | Ullah ........................... 705/7.29 |
| 8,104,066 B2 * | 1/2012 | Colsey et al. ................. 725/141 |
| 8,122,491 B2 | 2/2012 | Yee |
| 8,266,666 B2 * | 9/2012 | Friedman ..................... 725/133 |
| 8,331,987 B2 | 12/2012 | Rosenblatt ................. 455/556.2 |
| 8,539,357 B2 | 9/2013 | Hildreth |
| 8,601,526 B2 | 12/2013 | Nishimura et al. |
| 8,799,496 B2 * | 8/2014 | Phillips et al. ................. 709/231 |
| 2001/0044726 A1 | 11/2001 | Li et al. |
| 2002/0032907 A1 | 3/2002 | Daniels |
| 2002/0056087 A1 | 5/2002 | Berezowski et al. |
| 2002/0056119 A1 | 5/2002 | Moynihan |

(56) References Cited

U.S. PATENT DOCUMENTS

| | | |
|---|---|---|
| 2002/0059610 A1 | 5/2002 | Ellis |
| 2002/0075402 A1 | 6/2002 | Robson et al. |
| 2002/0078453 A1 | 6/2002 | Kuo |
| 2002/0090203 A1 | 7/2002 | Mankovitz |
| 2002/0157099 A1 | 10/2002 | Schrader et al. |
| 2002/0165751 A1 | 11/2002 | Upadhya |
| 2002/0165770 A1 | 11/2002 | Khoo et al. |
| 2002/0174430 A1 | 11/2002 | Ellis et al. |
| 2002/0194586 A1 | 12/2002 | Gutta et al. |
| 2002/0194600 A1 | 12/2002 | Ellis et al. |
| 2003/0005440 A1 | 1/2003 | Axelsson |
| 2003/0026592 A1 | 2/2003 | Kawahara et al. |
| 2003/0066085 A1 | 4/2003 | Boyer et al. |
| 2003/0070177 A1* | 4/2003 | Kondo et al. .................. 725/106 |
| 2003/0093803 A1 | 5/2003 | Ishikawa et al. |
| 2003/0110499 A1 | 6/2003 | Knudson et al. |
| 2003/0140343 A1 | 7/2003 | Falvo et al. |
| 2003/0149621 A1 | 8/2003 | Shteyn |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0208756 A1 | 11/2003 | Macrae et al. |
| 2003/0237093 A1 | 12/2003 | Marsh |
| 2004/0023810 A1 | 2/2004 | Ignatiev et al. |
| 2004/0064835 A1 | 4/2004 | Bellwood et al. |
| 2004/0070491 A1* | 4/2004 | Huang et al. .................. 340/10.5 |
| 2004/0097246 A1 | 5/2004 | Welch |
| 2004/0103434 A1 | 5/2004 | Ellis |
| 2004/0104806 A1 | 6/2004 | Yui et al. |
| 2004/0117831 A1 | 6/2004 | Ellis et al. |
| 2004/0177370 A1 | 9/2004 | Dudkiewicz |
| 2004/0210926 A1 | 10/2004 | Francis et al. |
| 2004/0210932 A1 | 10/2004 | Mori et al. |
| 2004/0268403 A1 | 12/2004 | Krieger et al. |
| 2005/0028208 A1 | 2/2005 | Ellis et al. |
| 2005/0120373 A1 | 6/2005 | Thomas et al. |
| 2005/0125718 A1 | 6/2005 | Van Doorn |
| 2005/0138660 A1 | 6/2005 | Boyer et al. |
| 2005/0149966 A1 | 7/2005 | Fairhurst et al. |
| 2005/0160461 A1 | 7/2005 | Baumgartner et al. |
| 2005/0204388 A1 | 9/2005 | Knudson et al. |
| 2005/0246746 A1* | 11/2005 | Yui et al. ..................... 725/80 |
| 2005/0251827 A1 | 11/2005 | Ellis et al. |
| 2005/0259963 A1 | 11/2005 | Sano et al. |
| 2005/0278741 A1 | 12/2005 | Robarts et al. |
| 2006/0007479 A1* | 1/2006 | Henry et al. .................. 358/1.15 |
| 2006/0026635 A1 | 2/2006 | Potrebic et al. |
| 2006/0026665 A1 | 2/2006 | Rodriquez et al. |
| 2006/0031883 A1 | 2/2006 | Ellis et al. |
| 2006/0053449 A1 | 3/2006 | Gutta |
| 2006/0083301 A1 | 4/2006 | Nishio |
| 2006/0098221 A1 | 5/2006 | Ferlitsch |
| 2006/0101492 A1 | 5/2006 | Lowcock |
| 2006/0190978 A1 | 8/2006 | Russ et al. |
| 2006/0218573 A1 | 9/2006 | Proebstel |
| 2006/0218604 A1 | 9/2006 | Riedl et al. |
| 2006/0253874 A1 | 11/2006 | Stark et al. |
| 2006/0263758 A1 | 11/2006 | Crutchfield et al. |
| 2006/0265427 A1 | 11/2006 | Cohen |
| 2006/0277579 A1 | 12/2006 | Inkinen |
| 2006/0294574 A1 | 12/2006 | Cha |
| 2007/0033607 A1 | 2/2007 | Bryan |
| 2007/0036303 A1 | 2/2007 | Lee et al. |
| 2007/0055989 A1 | 3/2007 | Shanks et al. |
| 2007/0074245 A1 | 3/2007 | Nyako et al. |
| 2007/0076665 A1 | 4/2007 | Nair et al. |
| 2007/0089132 A1 | 4/2007 | Qureshey et al. |
| 2007/0130089 A1 | 6/2007 | Chiu |
| 2007/0130283 A1 | 6/2007 | Klein et al. |
| 2007/0157240 A1 | 7/2007 | Walker |
| 2007/0161402 A1 | 7/2007 | Ng et al. |
| 2007/0162850 A1 | 7/2007 | Adler et al. |
| 2007/0186240 A1 | 8/2007 | Ward et al. |
| 2007/0214489 A1 | 9/2007 | Kwong et al. |
| 2007/0283395 A1 | 12/2007 | Wezowski |
| 2008/0046930 A1 | 2/2008 | Smith et al. |
| 2008/0046935 A1 | 2/2008 | Krakirian |
| 2008/0059988 A1 | 3/2008 | Lee et al. |
| 2008/0074546 A1 | 3/2008 | Momen |
| 2008/0077965 A1 | 3/2008 | Kamimaki et al. |
| 2008/0113614 A1* | 5/2008 | Rosenblatt ................... 455/3.05 |
| 2008/0120668 A1 | 5/2008 | Yau |
| 2008/0126919 A1* | 5/2008 | Uskali et al. .................. 715/200 |
| 2008/0127253 A1 | 5/2008 | Zhang et al. |
| 2008/0134256 A1 | 6/2008 | DaCosta |
| 2008/0155585 A1 | 6/2008 | Craner |
| 2008/0169929 A1 | 7/2008 | Albertson et al. |
| 2008/0184294 A1 | 7/2008 | Lemmons et al. |
| 2008/0196068 A1 | 8/2008 | Tseng |
| 2008/0282288 A1 | 11/2008 | Heo |
| 2008/0300985 A1* | 12/2008 | Shamp et al. ................... 705/14 |
| 2008/0301729 A1* | 12/2008 | Broos et al. ..................... 725/38 |
| 2009/0052859 A1 | 2/2009 | Greenberger et al. |
| 2009/0087039 A1 | 4/2009 | Matsuura |
| 2009/0125971 A1* | 5/2009 | Belz et al. ..................... 725/153 |
| 2009/0150925 A1 | 6/2009 | Henderson |
| 2009/0163139 A1 | 6/2009 | Wright-Riley |
| 2009/0165046 A1 | 6/2009 | Stallings et al. |
| 2009/0174658 A1 | 7/2009 | Blatchley et al. |
| 2009/0183208 A1 | 7/2009 | Christensen et al. |
| 2009/0210898 A1 | 8/2009 | Childress et al. |
| 2009/0217335 A1* | 8/2009 | Wong et al. ................... 725/114 |
| 2009/0222874 A1 | 9/2009 | White et al. |
| 2009/0248914 A1 | 10/2009 | Choi et al. |
| 2009/0249391 A1 | 10/2009 | Klein et al. |
| 2009/0271829 A1* | 10/2009 | Larsson et al. .................. 725/82 |
| 2009/0288131 A1 | 11/2009 | Kandekar et al. |
| 2009/0288132 A1 | 11/2009 | Hegde |
| 2009/0292671 A1 | 11/2009 | Ramig et al. |
| 2009/0298535 A1 | 12/2009 | Klein et al. |
| 2009/0313658 A1 | 12/2009 | Nishimura |
| 2010/0053458 A1 | 3/2010 | Anglin et al. |
| 2010/0071021 A1* | 3/2010 | Friedman ....................... 725/133 |
| 2010/0107046 A1 | 4/2010 | Kang et al. |
| 2010/0107194 A1 | 4/2010 | McKissick et al. |
| 2010/0146445 A1 | 6/2010 | Kraut |
| 2010/0146560 A1 | 6/2010 | Bonfrer |
| 2010/0146573 A1 | 6/2010 | Richardson et al. |
| 2010/0154021 A1* | 6/2010 | Howarter et al. .............. 725/141 |
| 2010/0169072 A1 | 7/2010 | Zaki et al. |
| 2010/0199313 A1 | 8/2010 | Rhim |
| 2010/0262987 A1 | 10/2010 | Imanilov |
| 2010/0310234 A1 | 12/2010 | Sigvaldason |
| 2011/0016492 A1 | 1/2011 | Morita et al. |
| 2011/0026384 A1 | 2/2011 | Ryu |
| 2011/0029922 A1 | 2/2011 | Hoffberg et al. |
| 2011/0069940 A1 | 3/2011 | Shimy et al. |
| 2011/0070819 A1 | 3/2011 | Shimy et al. |
| 2011/0072452 A1 | 3/2011 | Shimy et al. |
| 2011/0078731 A1 | 3/2011 | Nishimura |
| 2011/0107388 A1* | 5/2011 | Lee et al. ....................... 725/118 |
| 2011/0134320 A1 | 6/2011 | Daly |
| 2011/0157368 A1 | 6/2011 | Jo |
| 2011/0163939 A1 | 7/2011 | Tam et al. |
| 2011/0164175 A1 | 7/2011 | Chung et al. |
| 2011/0167447 A1 | 7/2011 | Wong |
| 2011/0258211 A1 | 10/2011 | Kalisky et al. |
| 2012/0072962 A1* | 3/2012 | Li et al. ....................... 725/110 |
| 2012/0072964 A1 | 3/2012 | Walter et al. |
| 2012/0105720 A1 | 5/2012 | Chung et al. |
| 2012/0114303 A1 | 5/2012 | Chung et al. |
| 2013/0047189 A1 | 2/2013 | Raveendran et al. |
| 2013/0191875 A1 | 7/2013 | Morris et al. |
| 2014/0250447 A1 | 9/2014 | Schink |

FOREIGN PATENT DOCUMENTS

| | | |
|---|---|---|
| DE | 19740079 | 3/1999 |
| EP | 0 774 853 | 5/1997 |
| EP | 0 793 225 | 9/1997 |
| EP | 0 805 594 | 11/1997 |
| EP | 1 363 452 | 11/2003 |

(56) References Cited

FOREIGN PATENT DOCUMENTS

| | | |
|---|---|---|
| EP | 2 129 113 | 12/2009 |
| EP | 2 154 882 | 2/2010 |
| EP | 2 299 711 | 3/2011 |
| GB | 2265792 | 10/1993 |
| GB | 2458727 | 10/2009 |
| JP | 03-022770 | 1/1991 |
| JP | 03022770 | 1/1991 |
| JP | 08-056352 | 2/1996 |
| JP | 09-102827 | 4/1997 |
| JP | 2001-084662 A | 3/2001 |
| JP | 2002153684 A | 5/2002 |
| JP | 2004080382 A | 3/2004 |
| JP | 2004215126 A | 7/2004 |
| JP | 2004304372 A | 10/2004 |
| JP | 2005150831 A | 6/2005 |
| JP | 2006101261 A | 4/2006 |
| JP | 2006-324809 A | 11/2006 |
| JP | 2007036911 A | 2/2007 |
| JP | 2007-081719 A | 3/2007 |
| JP | 2007524316 A | 8/2007 |
| JP | 2007-274246 A | 10/2007 |
| JP | 2008-035533 A | 2/2008 |
| JP | 2008079039 A | 4/2008 |
| JP | 2009060487 A | 3/2009 |
| JP | 2009081877 A | 4/2009 |
| JP | 2009111817 A | 5/2009 |
| JP | 2009130866 A | 6/2009 |
| JP | 2009164655 A | 7/2009 |
| JP | 2010510696 A | 4/2010 |
| WO | WO 87/03766 | 6/1987 |
| WO | WO 89/03085 | 4/1989 |
| WO | WO 94/14282 | 6/1994 |
| WO | WO 95/01056 | 1/1995 |
| WO | WO 95/01059 | 1/1995 |
| WO | WO 95/10910 | 4/1995 |
| WO | WO 95/28055 | 10/1995 |
| WO | WO 95/32585 | 11/1995 |
| WO | WO 96/07270 | 3/1996 |
| WO | WO 96/13932 | 5/1996 |
| WO | WO 96/20555 | 7/1996 |
| WO | WO 97/13368 | 4/1997 |
| WO | WO 97/31480 | 8/1997 |
| WO | WO 97/36422 | 10/1997 |
| WO | WO 97/47106 | 12/1997 |
| WO | WO 97/47143 | 12/1997 |
| WO | WO 97/49237 | 12/1997 |
| WO | WO 97/50251 | 12/1997 |
| WO | WO 98/10589 | 3/1998 |
| WO | WO 98/16062 | 4/1998 |
| WO | WO 98/17064 | 4/1998 |
| WO | WO 98/26584 | 6/1998 |
| WO | WO 99/14947 | 3/1999 |
| WO | WO 99/30491 | 6/1999 |
| WO | WO 00/33576 | 6/2000 |
| WO | WO 01/91458 | 11/2001 |
| WO | WO-0191460 A2 | 11/2001 |
| WO | WO-2004023810 A1 | 3/2004 |
| WO | WO 2007/036891 | 4/2007 |
| WO | WO 2008/042267 | 4/2008 |
| WO | WO-2008047184 A1 | 4/2008 |
| WO | WO 2009/067670 | 5/2009 |
| WO | WO-2009067676 A1 | 5/2009 |
| WO | WO-2009130862 A1 | 10/2009 |
| WO | WO 2009/148056 | 12/2009 |
| WO | WO 2009/151635 | 12/2009 |
| WO | WO 2011/008638 | 1/2011 |
| WO | WO 2011/037761 | 3/2011 |
| WO | WO 2011/037781 | 3/2011 |
| WO | WO 2011/084950 | 7/2011 |

OTHER PUBLICATIONS

Non-Final Office Action for U.S. Appl. No. 12/652,569 dated Nov. 29, 2012.
U.S. Appl. No. 11/324,202, filed Dec. 29, 2005, Yates.
"Honey, is there anything good on the remote tonight?", advertisement from Multichannel News, Broadband Week Section, p. 168, Nov. 30, 1998.
"How Evolve Works," from the Internet at http://www.evolveproducts.com/network.html, printed on Dec. 28, 1998.
"Jini Architecture Overview," by Jim Waldo, from the Internet at http://Java.sun.com/products/jini/whitepapers/architectureoverview.pdf pinted on Jan. 25, 1999. The document bears a copyright date of 1998.
"Reaching your subscribers is a complex and costly process-until now," from the Internet at http://www.evolveproducts.com/info.html, printed on Dec. 28, 1998.
"Sun's Next Steps in Digital Set-Tops," article in Cablevision, p. 56, Nov. 16, 1998.
"The Evolve EZ Guide. The Remote Control," from the Internet at http://www.evolveproducts.com/display2.html, printed on Dec. 28, 1998.
"Using StarSight 2," published before Apr. 19, 1995.
"What is Jini?", from the Internet at http://java.sun.com/products/jini/whitepapers/whatsjini.pdf, printed on Jan. 25, 1999.
"Why Jini Now?", from the internet at http://java.sun.com/products/jini/whitepapers/whyjininow.pdf, printed on Jan. 25, 1999. The document bears a copyright date of 1998.
Darrow, et al., "Design Guidelines for Technology-Mediated Social Interaction in a Presence Sensing Physical Space," Carnegie Mellon University Research Showcase, Carnegie Institute of Technology, Jan. 1, 2007, pp. 1-9.
Eitz, "Zukunftige Informations-Und Datenangebote Beim Digitalen Fernsehen—EPG Und "Lesezeichen"," Rundfunktechnische Mitteilungen, vol. 41, pp. 67-72, Apr. 30, 1997 (with full English translation attached).
Index Systems Inc., "Gemstar Service Object Model," Data Format Specification, Ver. 2.0.4, pp. 58-59.
Jaidev, "XSLT—A Wired and Wireless Case Study," http://csharpcomputing.com/XMLTutorial/Lession15.htm.
Neumann, "WDR Online Aufbau Und Perspektiven Automatisierter Online-Dienste Im WDR," Rundfunktechnische Mitteilungen, vol. 41, pp. 56-66, Jan. 21, 1997 (with full English translation attached).
Papers Delivered (Part 1), Gondow, S. et al., "The Architecture of Communication Migration and Media State Management for Distributed Applications on Wearable Networks," 61st National Conference, Information Processing Society of Japan, Oct. 3-5, 2000.
Pogue, "State of the Art: For TiVo and Replay, New Reach," N.Y. Times, May 29, 2003.
Randerson, "Let Software Catch the Game for You," New Scientist, Jul. 3, 2004.
Rogers, "Telcos vs. Cable TV: The Global View," Data Communications, vol. 24, No. 13, New York, pp. 75, 76, 78 and 80, Sep. 21, 1995.
Final Office Action dated Jun. 13, 2013 for U.S. Appl. No. 12/652,569.

* cited by examiner

350

```
                    Language set-up
Subtitles:    ☐ enabled     ☐ disabled

Language:    ☐ English     ☐ French      ☐ Japanese
             ☐ Spanish     ☐ Chinese     ☐ Korean Audio Dubbing:  ☐ enabled   ☐ disabled Language:    ☐ English     ☐ French      ☐ Japanese
             ☐ Spanish     ☐ Chinese     ☐ Korean
```

FIG. 3

SYSTEMS AND METHODS FOR TRANSFERRING CONTENT BETWEEN USER EQUIPMENT AND A WIRELESS COMMUNICATIONS DEVICE

BACKGROUND OF THE INVENTION

This invention relates to interactive application systems, and more particularly, to interactive media guidance application systems in which media guidance application functionality may be provided by a wireless communications device or coordinated between a wireless communications device and one or more user equipment devices.

Interactive applications are typically implemented, at least in part, on a user's equipment (e.g., a set-top box). Examples of interactive applications include interactive program guides, e-mail, home shopping, wagering and other e-commerce applications, financial applications, Web browsers, games, and other user equipment based applications. Running these applications on the user equipment typically prevents other users from watching media content on that user equipment. In addition, running such applications on a stationary user equipment platform may prevent users from accessing the features of those applications when away from the stationary platform.

SUMMARY OF THE INVENTION

In view of the foregoing, an interactive application system is provided that includes a wireless communications device with a display.

The wireless communications device may be any suitable wireless communications device, such as a touch-screen remote, personal digital assistant (PDA), mobile phone (e.g., a smartphone) or other wireless communications device. The wireless communications device may provide a user with access to interactive application functionality remotely or while viewing media content. For clarity, the present invention will be illustrated in connection with a system in which an interactive media guidance application is implemented on user equipment and wireless communications device. User equipment may include one or more of a television, a set-top box, a DVD player/recorder, a Bluray player/recorder, a DVR, a media server, a security camera, GPS navigation unit, etc.

In some embodiments, the wireless communications device may include a touch-screen LCD or OLED display, and one or more communication interfaces to communicate with the user equipment. The communication interfaces may include infrared, Bluetooth, Wi-Fi, or any other suitable interface.

The wireless communications device may support many of the features of interactive program guides without interrupting content being presented on user's equipment (e.g., a television). For example, the wireless communications device may display the available video-on-demand listings for a channel while the non video-on-demand listings are displayed on the user's equipment (e.g., a television). Moreover, when a user selects a program listing from the program listings grid (see e.g., FIG. 9), the note section of the guide may be unable to show the entire content of the note or program description. The wireless communications device may then receive and display the entire note or description, which may include rich graphics, video, and/or advertisements, in an expanded manner. Additionally, the wireless communications device may receive and display the content being displayed in the video region of the interactive media guidance application (see, FIG. 9) while the user browses the program listings on e.g., the television.

In some embodiments, the wireless communications device may provide access to subtitles or alternate language dubbings. In one embodiment, when watching a movie in English on a television, a Chinese dubbing may simultaneously be played on the wireless communications device. In one embodiment, the wireless communications device may stream the Chinese dubbing from a media content source (see, FIG. 12) via the Internet.

In another embodiment, a program may be displayed on the television with subtitles in one language, e.g., English, while the same program may be simultaneously displayed on the wireless communications device with subtitles in, e.g., Chinese.

In some embodiments, the wireless communications device may be synchronized or may communicate with various other devices and applications. For example, a user may use the wireless communications device to type addresses, search for locations, etc from inside the home instead of having to type on a GPS navigation unit. The wireless communications device may then transfer the entered information to the GPS navigation unit via Wi-Fi, Bluetooth, etc.

In another embodiment, the wireless communications device may implement a surfing guide application while the user is watching a broadcast program on user equipment, e.g., the television. The surfing guide application running on wireless communications device may obtain screenshots of programs playing on other channels, and display the screenshots on wireless communications device (see FIG. 12). The screenshots may be downloaded by the surfing guide application from a server which may be located at a media content source or a media guidance data source (see, FIG. 12). The server may be configured to periodically capture screenshots of various channels and store them in a database. When the user selects a screenshot, the corresponding program may be displayed in a preview area on the wireless communications device. The program may be streamed from the server where the screenshots were downloaded. Alternatively, or in addition, preview area may display a description of the program, which may also be downloaded from the server. If the user wishes to watch the selected program on, e.g., a television, the user may "tap" an on-screen button. Upon tapping the on-screen button, the surfing guide application may exchange one or more application communications with the primary guide telling the primary guide that the user has indicated a desire to tune to a particular channel. The primary guide may cause the set-top box to tune to the indicated channel. In another suitable approach, wireless communications device may communicate directly with the set-top box and instruct the set-top box to tune to the indicated channel.

In yet another embodiment, media content may be transferred between a primary display of the user equipment (e.g., a television) and the wireless communications device. For example, while watching a program on the user equipment (e.g., the television), the user may need to leave the room (e.g., to use the bathroom), which may cause the user to miss part of the program. In some embodiments, wireless communications device may be configured to automatically start displaying the content being displayed on the primary display, e.g., a television when the wireless communications device is out of range from, for example, the television or the set-top box. Upon detecting that it is out of range, wireless communications device may then switch to a longer range link such as Wi-Fi and stream the content from e.g., the set-top box over the Wi-Fi link and display it on the wireless communications device. The content may be streamed directly from the user equipment or may be received from another source such as a media content source. In one embodiment, wireless communications device may be configured to automatically display not only video, but anything that is being displayed on the television when the wireless communications device goes out of range. For example, if the user is browsing program listings, and leaves the room, wireless communications device may automatically display the program listings that were displayed on the television. In some embodiments, wireless communications device may also automatically adjust it's display resolution so as not to distort what is being displayed (e.g., display text so it is legible). In one embodiment, wireless communications device may be configured to allow the user to manually transfer the television display to the wireless communications device. Accordingly, the user may manually select (e.g., by "tapping" an on-screen button on the wireless communications device, or by shaking the wireless communications device) to start streaming content that is being displayed on user equipment to the wireless communications device.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 3 shows an exemplary configuration screen in accordance with an embodiment of the invention;

DETAILED DESCRIPTION

Media guidance functionality may be provided on a wireless communications device, such as a PDA, a smartphone, a portable video player, a portable music player, a portable gaming machine, or other wireless device. The media guidance functionality may be coordinated between the wireless communications device and one or more user equipment devices such as a television, a set-top box, a DVD player/recorder, a Bluray player/recorder, a DVR, a media server, a security camera, GPS navigation unit, etc. Providing a media guidance application on a wireless communications device is discussed in greater detail in, for example, Chiu et al., U.S. patent application Ser. No. 12/495,522, filed Jun. 30, 2009, which is hereby incorporated by reference herein in its entirety.

Figure 1:
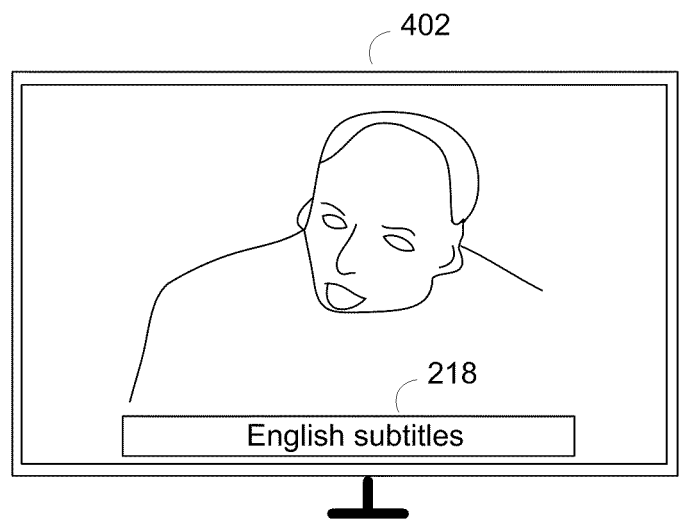
FIG. 1 shows exemplary display screens in accordance with an embodiment of the invention.
Figure 1:
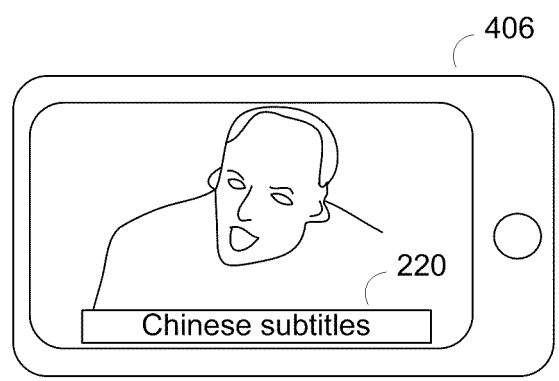
Figure 2:
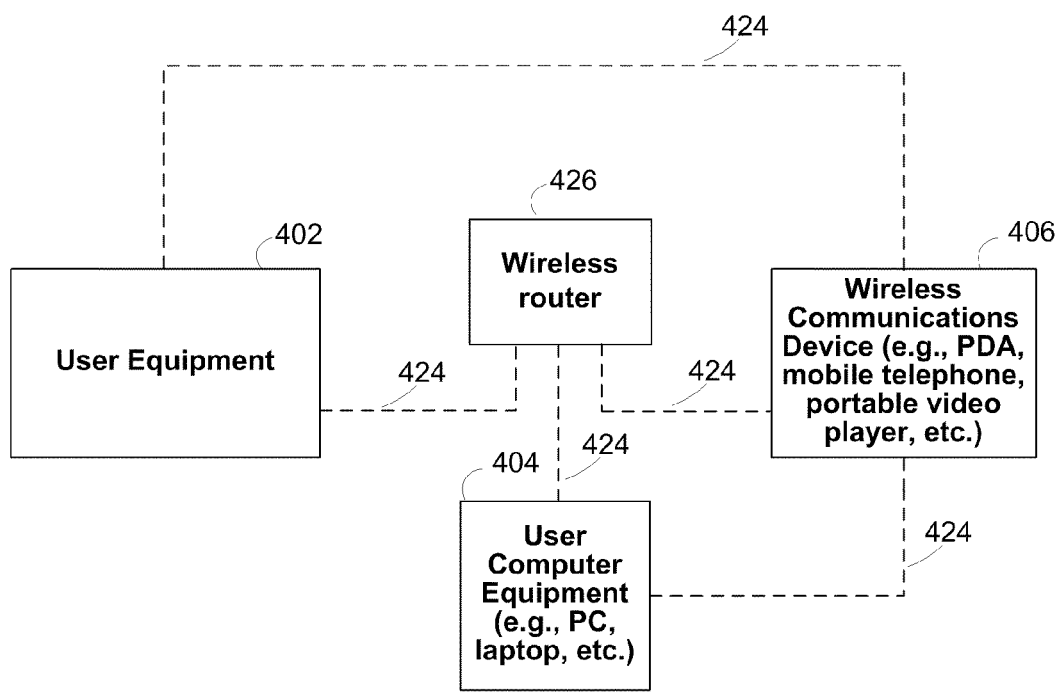
FIG. 2 shows a simplified diagram of an illustrative interactive media system in accordance with an embodiment of the invention.

In some embodiments, wireless communications device 406 may be used to provide enhanced viewing options such as multi-language support. One example of the type of media guidance functionality that may be provided on wireless communications device 406 is providing subtitles and audio dubbings in one or more languages on wireless communications device 406. For example, a program may be displayed on user equipment 402 (e.g., a television) with subtitles in one language e.g., English, while the same program may be simultaneously displayed on wireless communications device 406 with subtitles in another language e.g., Chinese. FIG. 2 shows exemplary displays of user equipment 402 (e.g., a television) and wireless communications device 406. As shown in FIG. 1, user equipment 402 displays a program while displaying English subtitles 218, and wireless communications device 406 displays the same program as displayed on user equipment 402 but with Chinese subtitles 220. Video corresponding to the program or movie may be streamed to wireless communications device 406 from user equipment 402 over communications path 424 (e.g., Wi-Fi or Bluetooth).

In one embodiment, in addition to subtitles, wireless communications device 406 may also provide access to audio dubbings. For example, when watching a movie in English on user equipment 402 (e.g., a television), a Chinese dubbing of the movie may be played on wireless communications device 406. Thus, the user may watch the movie on the television but listen to the corresponding audio in Chinese on wireless communications device 406. The audio may be played on a speaker included in wireless communications device 406 or may be played through a pair of headphones connected to wireless communications device 406.

FIG. 2 shows a generalized embodiment of an interactive application system in accordance with an embodiment of the present invention. More specific implementations of the devices shown in FIG. 2 are discussed below in connection with FIGS. 11-14. In order to provide media guidance functionality on wireless communications device 406, wireless communications device 406 may communicate with user equipment 402 and user computer equipment 404 over communications path 424. Communications path 424 may be a wireless link such as Wi-Fi, Bluetooth, etc. Communications path 424 may allow transfer of data such as audio, video, text, etc between wireless communications device 406 and user equipment 402 and user computer equipment 404. In the case of a Bluetooth link, wireless communications device 406 may communicate directly with user equipment 402 and user computer equipment 404. In the case of a Wi-Fi link, wireless communications device 406 may communicate with user equipment 402 and user computer equipment 404 via, for example, wireless router 426.

In one embodiment, the subtitles and/or the audio dubbing may be streamed from user equipment 402 (e.g., a set-top box) to wireless communications device 406 over communications path 424. Alternatively, the subtitles and/or the audio dubbing may be obtained by wireless communications device 406 from a media provider (e.g., media content source 416 (FIG. 12)) via the Internet.

The user may enable or disable subtitles and audio dubbings, and may also select a language for the subtitles and audio dubbing using wireless communications device 406. FIG. 3 discloses exemplary configuration screen 350 which may be used by a user to enable or disable subtitles and audio dubbings for the wireless communications device. In addition, configuration screen 350 may be used to select a language for the subtitles and the audio dubbing. In an exemplary embodiment, if subtitles are not available in the language the user chooses, wireless communications device 406 may obtain a translation of the subtitles in the user chosen language. For example, wireless communications device 406 may obtain subtitles from user equipment 402 in a language that is available (e.g., English) and use a web service such as Babblefish™ or Google™ translate to obtain a translation of the subtitles in the user chosen language.

In addition to subtitles and audio dubbings, wireless communications device 406 and/or user equipment 402 (e.g., a television) may display other supplemental content relating to a program or movie while the program or movie is displayed on user equipment 402. For example, while a user is watching a movie on user equipment 402, wireless communications device 406 may display supplemental content such as, director's comments, actor's comments, reviews, etc. Alternatively, the movie may be streamed to wireless communications device 406, while the supplemental content is displayed on user equipment 401 (e.g., a television). The supplemental content may be provided on for example, a DVD or Bluray disc, or alternatively, may be obtained by wireless communications device 406 from media content source 416 or from a third party via the Internet. When the supplemental content is provided on a DVD or Bluray disc, user equipment 402 may stream or transfer the content to wireless communications device 406 via Wi-Fi, Bluetooth, etc. In another example, supplemental content related to sports shows, game shows or shows such as a poker tournament may be shown on wireless communications device 406. For example, while a user is watching a poker tournament on user equipment 402, wireless communications device may display the players' cards, or during a baseball game, wireless communications device 406 may display the score and other stats. This supplemental content may be obtained by wireless communications device 406 from for example, user equipment 402, media content provider 416 or from a third party via the Internet.

Figure 4:
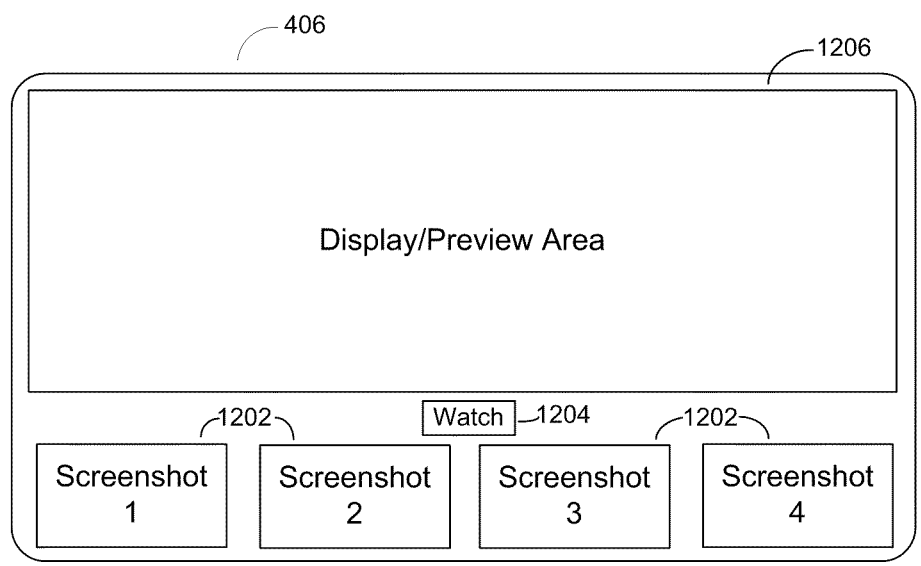
FIG. 4 shows an illustrative screen of the surfing guide application in accordance with an embodiment of the present invention.

Another example of media guidance functionality that may be provided on wireless communications device 406 is providing an interactive media guidance application which provides media guidance through an interface that allows users to efficiently navigate media selections and easily identify media. One example of such an application is referred to herein as a surfing guide application. FIG. 4 shows an exemplary display screen of the surfing guide application in accordance with an embodiment of the present invention. The surfing guide application shown in FIG. 4, allows a user to browse, on wireless communications device 406, screenshots of programs playing on other channels while watching a program on user equipment 402 (e.g., a television). For example, while the user is watching a broadcast program on user equipment 402, the surfing guide application may obtain screenshots of programs playing on other channels, and display the screenshots on wireless communications device 406 as shown in FIG. 4. As shown in FIG. 4, screenshots 1202 may be displayed along the bottom of the display area, while a preview area 1206 may be displayed along the top.

Figure 5:
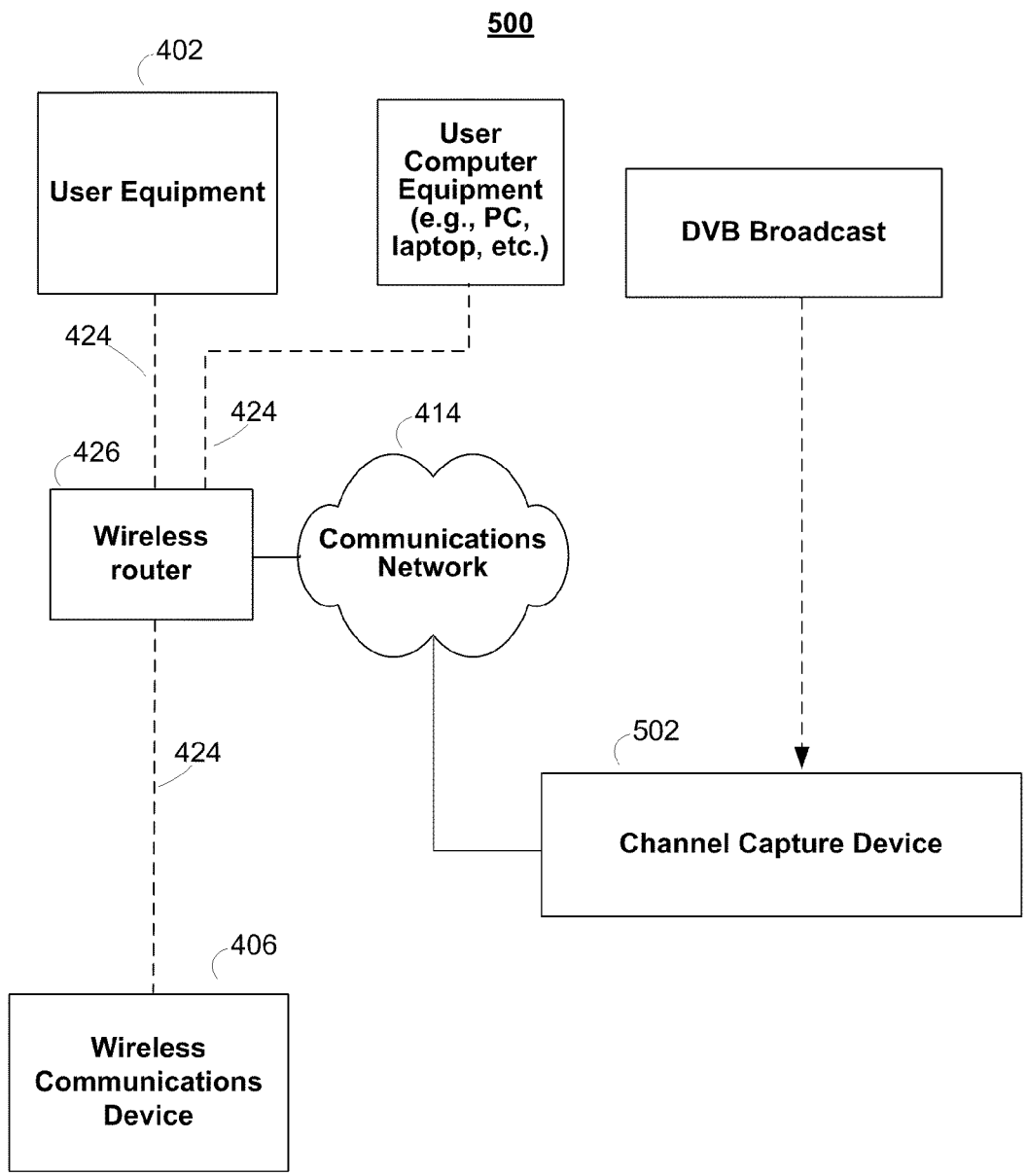
FIG. 5 shows a simplified diagram of an illustrative interactive media system in accordance with an embodiment of the invention.

Screenshots 1202 may be downloaded by the surfing guide application on to wireless communications device 406 from channel capture device 502. FIG. 5 discloses a generalized embodiment of communications system 500 for providing the surfing guide application on wireless communications device 406 in accordance with an embodiment of the present invention. As shown in FIG. 5, wireless communications device 406 may communicate with user equipment 402 over communications path 424 (e.g., a Wi-Fi link) via a wireless router 426. Channel capture device 502 may be a server which may be configured to periodically capture screenshots of programs playing on various broadcast channels and store them in a database. Channel capture device 502 may include a tuner (not shown) to receive DVB (digital video broadcasting) broadcasts of various channels, and may periodically capture and store screenshots of the various channels. Wireless communications device 406 may connect to channel capture device 502 via the Internet using, for example, a Wi-Fi link in a home network. When the user selects a screenshot 1202, (e.g., by "tapping" on the screenshot) the corresponding program may be displayed in preview area 1206. The program may be streamed from channel capture device 502 or from a media provider (e.g., media content source 416). Alternatively, preview area 1206 may display the selected screenshot, or display a description of the program, which may also be downloaded from channel capture device 502 or a media provider (e.g., media content source 416).

In addition to screenshots, the surfing guide application may also obtain other images related to the program, such as cover art, posters, etc. These images may be displayed on wireless communications device 406 in a manner similar to screenshots 1202 as shown in FIG. 4. These images may also be downloaded from channel capture device 502 which may obtain and store the images on a database. Alternatively, the images be obtained from either a media content provider or from a third party server.

If the user wishes to watch the selected program on user equipment 402, e.g., a television, the user may "tap" watch button 1204. Upon "tapping" watch button 1204, wireless communications device 406 may communicate directly with user equipment 402, using for example, an IR or Bluetooth link, and instruct user equipment 402 (e.g., a set-top box) to tune to the indicated channel. In another suitable approach, the surfing guide application may exchange one or more application communications with the media guidance application running on user equipment 402 (e.g., a set-top box) telling the media guidance application that the user has indicated a desire to tune to a particular channel. The media guidance application may then cause user equipment 402 (e.g., a set-top box) to tune to the indicated channel.

Figure 6:
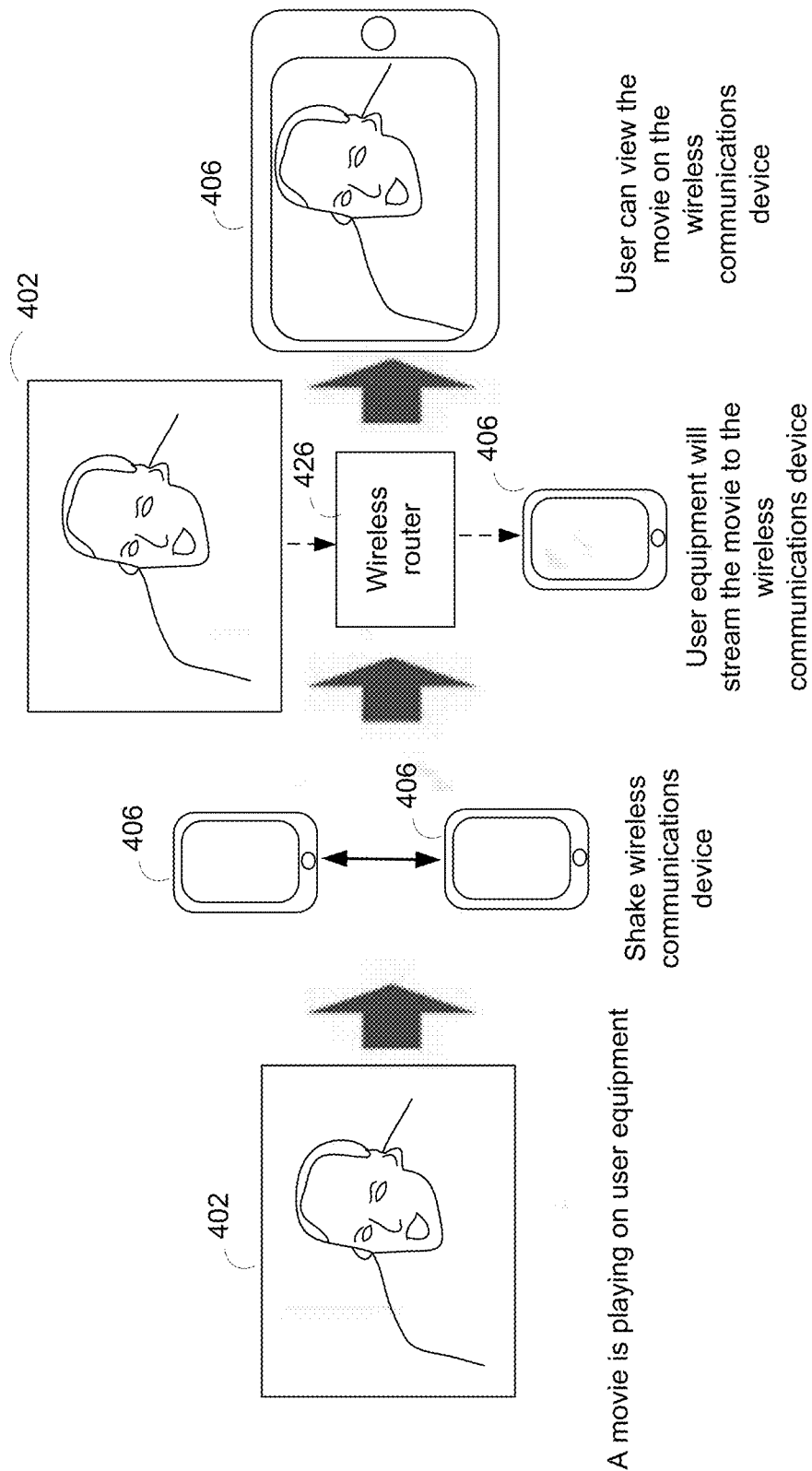
FIG. 6 shows an illustrative process of streaming video to the wireless communications device of FIG. 1.
Figure 7:
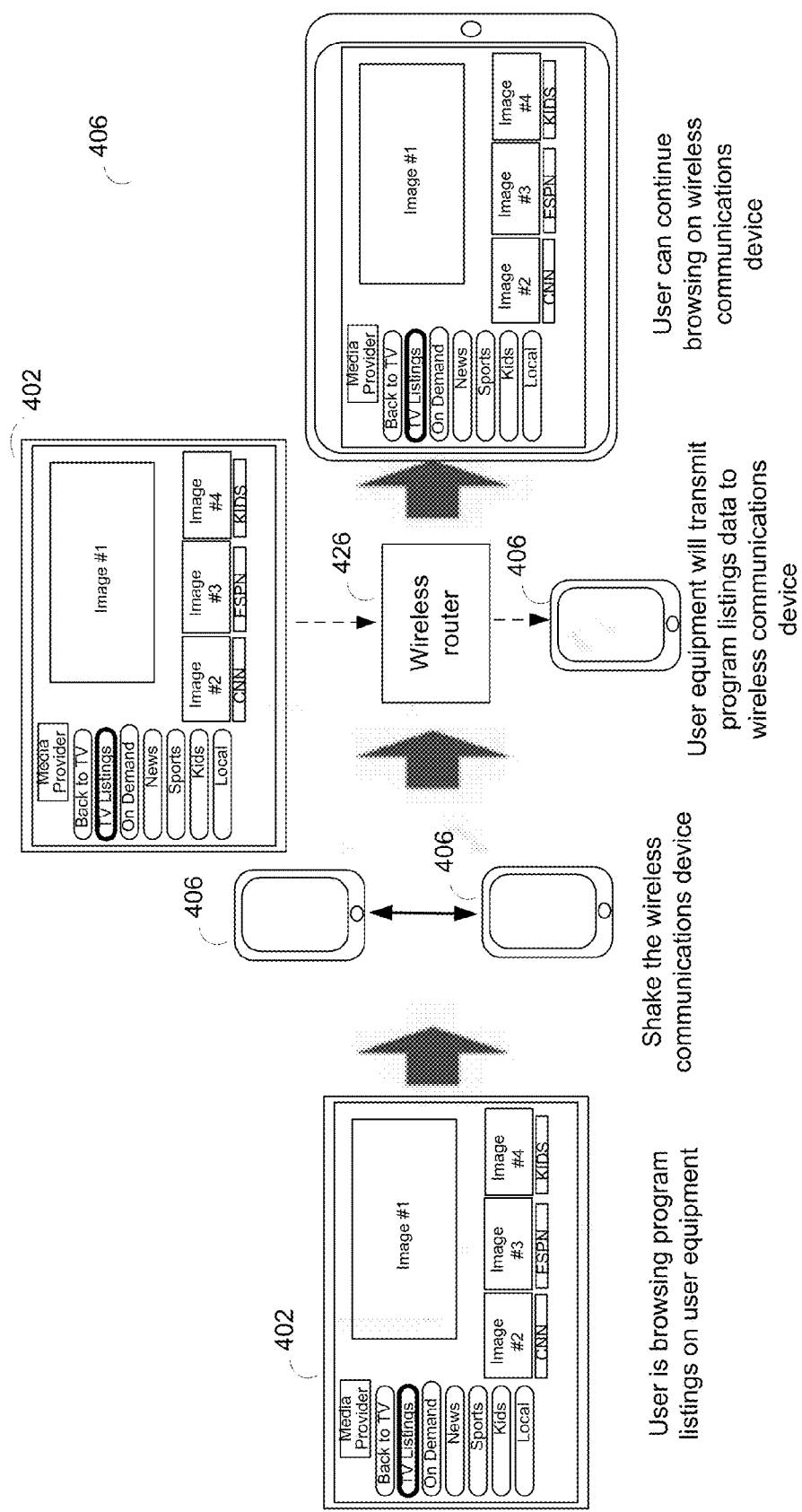
FIG. 7 shows an illustrative process of streaming program guide listings to the wireless communications device of FIG. 1.

The user may want to easily transfer media content playback or applications between wireless communications device 406 and user equipment 402. In some embodiments, several features found in modern smartphones may be used to enhance the media guidance functionality provided on wireless communications device 406 and allow the user to transfer content between wireless communications device 406 and user equipment 402. For example, various modern smartphones and portable media players include accelerometers and/or gyroscopes to enable a user to provide input by shaking, or rotating the device. As shown in the illustrative embodiment of FIG. 6, a user may shake wireless communications device 406 a predetermined number of times (e.g., two times) to enable streaming of video that is being displayed on user equipment 402 (e.g., a television) to wireless communications device 406. User equipment 402, such as a set-top box or a media server, may stream the video to wireless communications device 406 via wireless router 426 over communications path 424. As shown in FIG. 6, the user may then view the program on wireless communications device 406.

In some embodiments, shaking wireless communications device 406 (e.g., three times), may enable streaming of video from wireless communications device 406 to user equipment 402 (e.g., set-top box). For example, if the user has downloaded a movie or TV show to wireless communications device 406 from a content provider, and prefers to watch it on a larger screen (e.g., a television), the user may simply shake wireless communications device 406 while the movie or TV show is playing, and the movie or TV show will be streamed from wireless communications device 406 to user equipment 402 via wireless router 426 over communications path 424.

In addition to enabling streaming of video to/from wireless communications device 406 over communications path 424, the shaking feature may be applied to various other scenarios. For example, if the user is browsing guide listings on user equipment, (e.g., a television), the user may shake wireless communications device 406 to enable browsing of guide listings on wireless communications device 406. User equipment 402 (e.g., a set-top box), may stream or transfer guide listings to wireless communications device 406 via wireless router 426 over communications path 424. The user may then browse the guide listings on wireless communications device 406.

Although the above embodiments have been described using a shaking gesture, it should be noted that any other suitable gesture may be utilized. For example, swiping across the touchscreen of wireless communications device 406, or a pointing gesture made using the wireless communications device 406, etc may be used to begin transferring of content between user equipment 402 and wireless communications device 406. Additionally, the gestures may be used to begin or stop transfer of content not only from user equipment 402 to wireless communications device 406, but also to begin or stop transfer of content from wireless communications device 406 to user equipment 402. Moreover, content may be transferred to wireless communications device 406 or to user equipment 402 from a third party. For example, if the user is watching a video on user equipment 402 from a service such as, YouTube™ or Hulu™, the user may perform one of the gestures described above (e.g., shaking, swiping, etc) to begin streaming the video to wireless communications device 406 directly from YouTube™, Hulu™, etc. Similarly, if the user is watching a video from YouTube™ or Hulu™ on wireless communications device 406, the user may perform one of the gestures (shaking, swiping, etc) to begin streaming the video to user equipment 402 directly from YouTube™ or Hulu™.

In some embodiments, transferring content between user equipment 402 and wireless communications device 406 (and a third party, e.g., YouTube™, Hulu™, etc) may be done automatically. For example, while watching a program on user equipment 402 (e.g., a television), the user may need to leave the room (e.g., to use the bathroom), which may cause the user to miss part of the program. In some embodiments, wireless communications device 406 may be configured to automatically start displaying the content being displayed on television when wireless communications device 406 is out of range from user equipment 402 (e.g., a television). Whether wireless communications device 406 is out of range may be determined using a short range link such as infrared or Bluetooth. For example, if the user leaves the room with wireless communication device 406, the infrared (which requires a line of sight) or Bluetooth link between wireless communications device 406 and user equipment 402 will likely be broken. Upon detecting that the short range link (e.g., IR or Bluetooth) is severed, wireless communications device 406 may determine that it is out of range. Wireless communications device 406 may use a longer range link (e.g., Wi-Fi, cellular link, etc) to stream the content from user equipment 402 via wireless router 426, and display it on wireless communications device 406. The longer range link may be established upon determining that the short range link is severed or may have been previously established.

In one embodiment, whether wireless communications device 406 is out of range from user equipment 402 may be determined using a microphone (not shown) included in wireless communications device 406. For example, the microphone may be used to listen to the audio playing on user equipment 402. If the volume of the audio is drastically reduced (e.g., more than 80%), wireless communications device 406 may determine that it is out of range from user equipment 402, and thus, may switch to a longer range link (e.g., Wi-Fi) to start streaming content from user equipment 402. Alternatively, the longer range link (e.g., Wi-Fi, cellular link, etc) may be used to determine whether wireless communications device 406 is out of range. For example, the longer range link may be used to detect movement, or detect positioning (e.g., using signal strength, triangulation, etc).

In one embodiment, wireless communications device 406 may be configured to automatically display not only video, but anything that is being displayed on user equipment 402 when wireless communications device 406 goes out of range. For example, if the user is browsing program listings, and leaves the room, wireless communications device 406 may automatically display the program listings that were displayed on user equipment 402. In some embodiments, wireless communications device 406 (FIG. 12) may also automatically adjust it's display resolution so as not to distort what is being displayed (e.g., display text so it is legible). In another embodiment, wireless communications device 406 may be configured to allow the user to manually select when to display whatever is being displayed on user equipment 402 regardless of whether wireless communications device 406 (FIG. 12) is out of range. For example, even though a user may step away from user equipment 402, wireless communications device 406 may still be within range of user equipment 402. Accordingly, the user may manually select (e.g., by "tapping" an on-screen button on the wireless communications device, or by shaking the wireless communications device) to start streaming content that is being displayed on user equipment 402 to wireless communications device 406.

When wireless communications device 406 comes back within range of user equipment 402, it may automatically instruct user equipment 402 to begin displaying the content that was being displayed on wireless communications device 406. If wireless communications device 406 was previously receiving content from a third party (e.g., YouTube™, Hulu™, etc), wireless communications device may automatically instruct user equipment 402 to begin streaming content from the third party.

Figure 8:
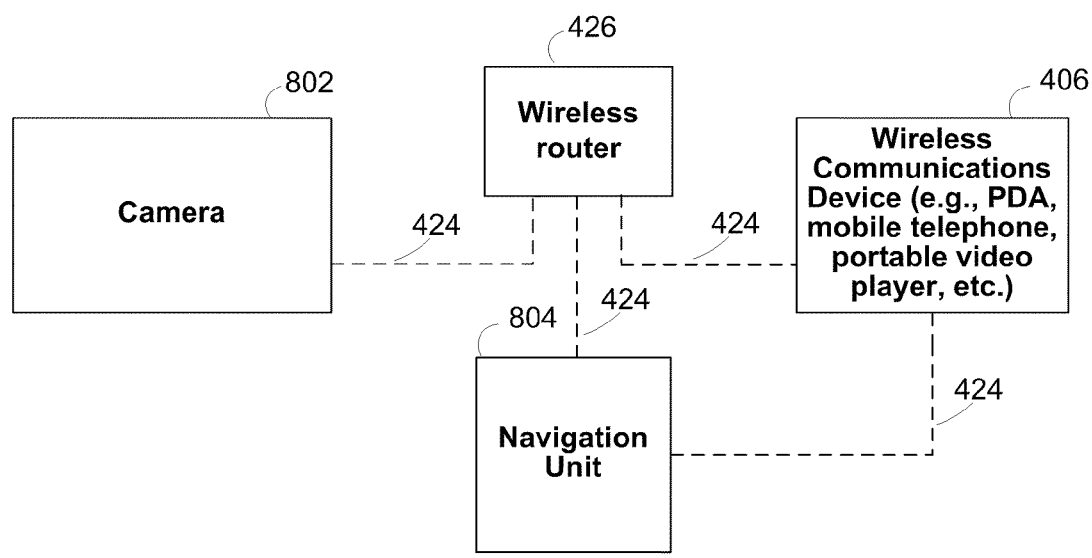
FIG. 8 shows a simplified diagram of an illustrative interactive media system in accordance with an embodiment of the invention.

In some embodiments, wireless communications device 406 may be configured to communicate with other network capable devices such as Digital Living Network Alliance$^{SM}$ (DLNA) compliant devices. FIG. 8 discloses an illustrative communications system according to an embodiment of the present invention. User equipment 402 may include one or more DLNA compliant devices such as a camera 802 (e.g., a security camera, a baby monitoring camera, etc.) and a GPS navigation unit 804. Wireless communications device 406 (FIG. 12) may be wirelessly connected to the camera 802 via communications path 424, and when the camera detects motion, wireless communications device 406 (FIG. 12) may interrupt the content being displayed on wireless communications device 406 (FIG. 12), if any, and automatically start displaying a video feed from the camera. The video feed from the camera may be streamed to wireless communications device 406 (FIG. 12) over communications path 424. Alternatively, the video feed may also be displayed on user equipment 402 (e.g., a television). Additionally, the user may manually select to view the video feed from the camera. In an exemplary embodiment, a camera placed in an oven or on top of a stove may be used to monitor the status of food being cooked. The user may watch a video feed from the camera on wireless communications device 406 to monitor food being cooked while watching a program on user equipment 402. Furthermore, depending on the range and strength of the signal between the camera and wireless communications device 406, the user may be able to take wireless communications device 406 outside of the home, while still being able to watch the video feed from the camera. As another example, wireless communications device 406 (FIG. 12) may be used to monitor the temperature of a turkey being cooked by communicating with a DLNA enabled thermometer.

Furthermore, wireless communications device 406 may also include a built-in camera which may be used as a webcam. For example, a user may use wireless communications device 406 to have a video chat with another user. Wireless communications device 406 may use a Wi-Fi link to transmit and receive video and audio to and from the other user via the Internet. Moreover, wireless communications device 406 may also include a built-in microphone (not shown). A user may use the microphone to communicate with other users via user equipment 402 or user computer equipment 404. For example, if the user wishes to communicate with another user who is using a computer in a different room, wireless communications device 406 may establish a Wi-Fi connection with the computer. The connection may be used by wireless communications device 406 to transmit audio received via the built-in microphone to the computer. Similarly, wireless communications device 406 may receive audio from the computer via the Wi-Fi link.

In some embodiments, the wireless communications device may be synchronized or communicate with various other devices and applications. For example, a user may use wireless communications device 406 to type addresses, search for locations, etc instead of having to type on GPS navigation unit 804 which may be a portable unit or part of a navigation system in an automobile. The entered information may be stored on wireless communications device 406 until wireless communications device 406 (FIG. 12) is within range of the GPS navigation unit. Wireless communications device 406 may then transfer the entered information to the GPS navigation unit over communications path 424 (e.g., Wi-Fi, Bluetooth, etc).

The interactive media guidance applications discussed above may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc. Guidance applications also allow users to navigate among and locate multimedia content. The term multimedia is defined herein as media and content that utilizes at least two different content forms, such as text, audio, still images, animation, video, and interactivity content forms. Multimedia content may be recorded and played, displayed or accessed by information content processing devices, such as computerized and electronic devices, but can also be part of a live performance. It should be understood that the invention embodiments that are discussed in relation to media content are also applicable to other types of content, such as video, audio and/or multimedia.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held devices such as, PDAs, mobile telephones, or other mobile devices.

The various devices and platforms that may implement media guidance applications are described in more detail below.

Figure 9:
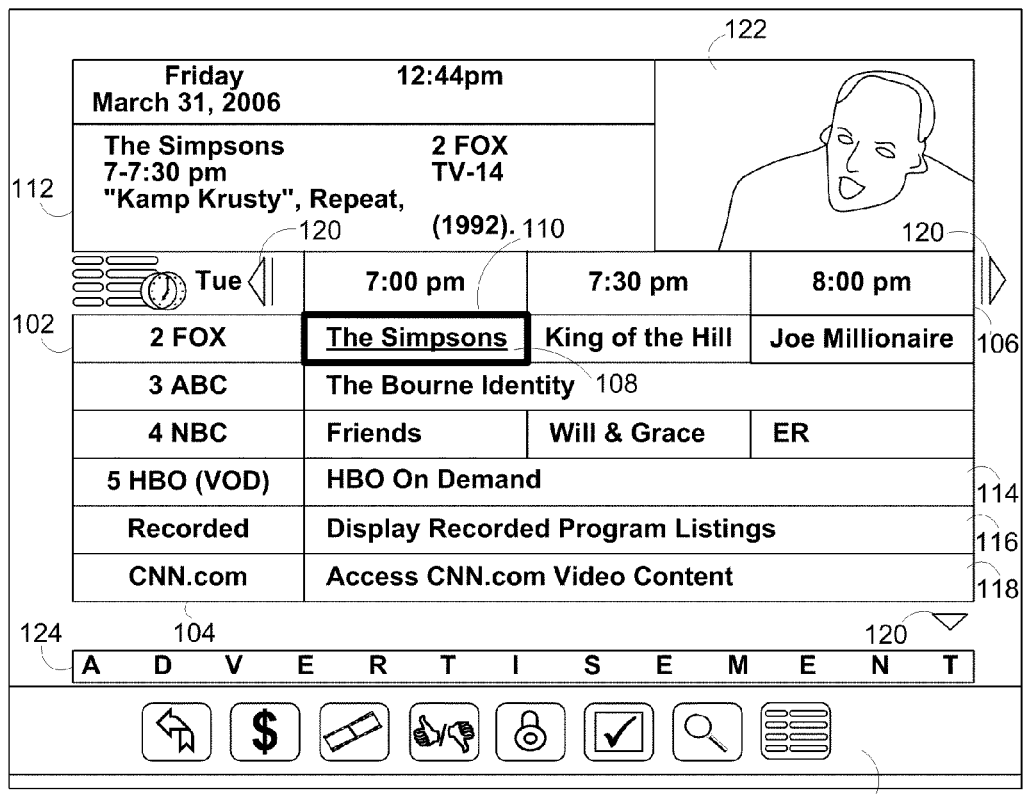
FIG. 9 shows an illustrative display screen using a grid format that may be used to provide guidance for various types of media in accordance with one embodiment of the invention.
Figure 10:
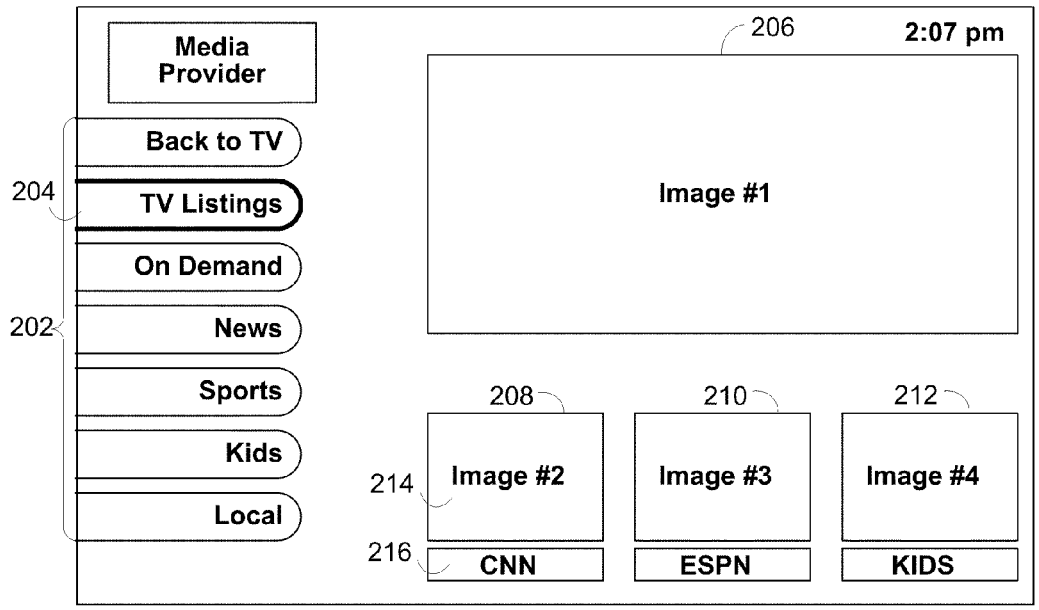
FIG. 10 shows an illustrative display screen using a mosaic that may be used to provide guidance for various types of media in accordance with an embodiment of the present invention.

One of the functions of the media guidance application is to provide media listings and media information to users. FIGS. 9-10 show illustrative display screens that may be used to provide media guidance, and in particular media listings. The display screens shown in FIGS. 9-10 may be implemented on any suitable device or platform. While the displays of FIGS. 9-10 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 9 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 402. Information relating to the program listing selected by highlight region 402 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 12. Additional personalized media guidance application features are described in greater detail in Ellis et al., U.S. patent application Ser. No. 11/179,410, filed Jul. 11, 2005, Boyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

Another display arrangement for providing media guidance is shown in FIG. 10. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 9, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 11:
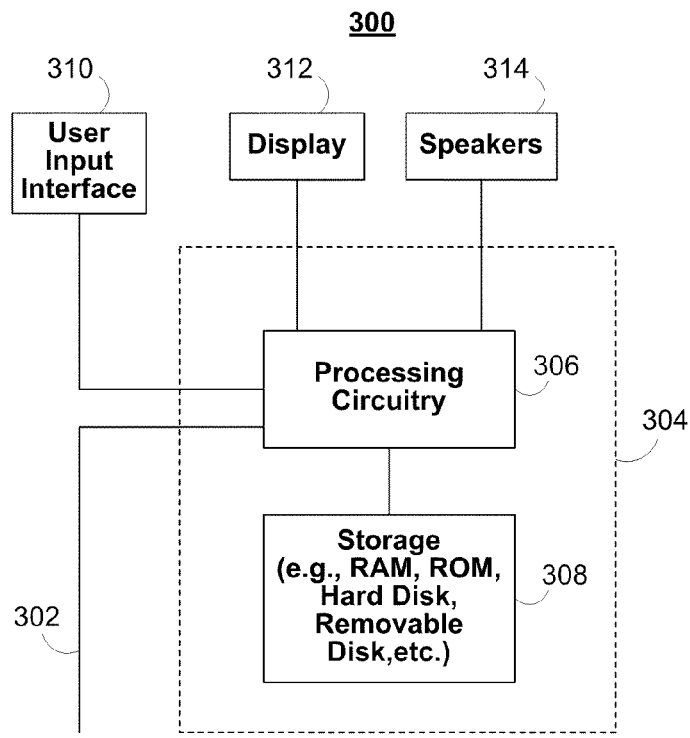
FIG. 11 shows an illustrative user equipment device in accordance with an embodiment of the invention.

Users may access media content and the media guidance application from one or more user equipment devices. FIG. 11 shows a generalized embodiment of illustrative user equipment device 300. More specific implementations of user equipment devices are discussed below in connection with FIG. 12. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 11 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 12). In addition, communications circuitry may include circuitry (e.g. Bluetooth) that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to allow simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from the VBI of a television channel, from an out-of-band feed, or using another suitable approach). In another embodiment, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In yet other embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be a EBIF widget. In other embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 12:
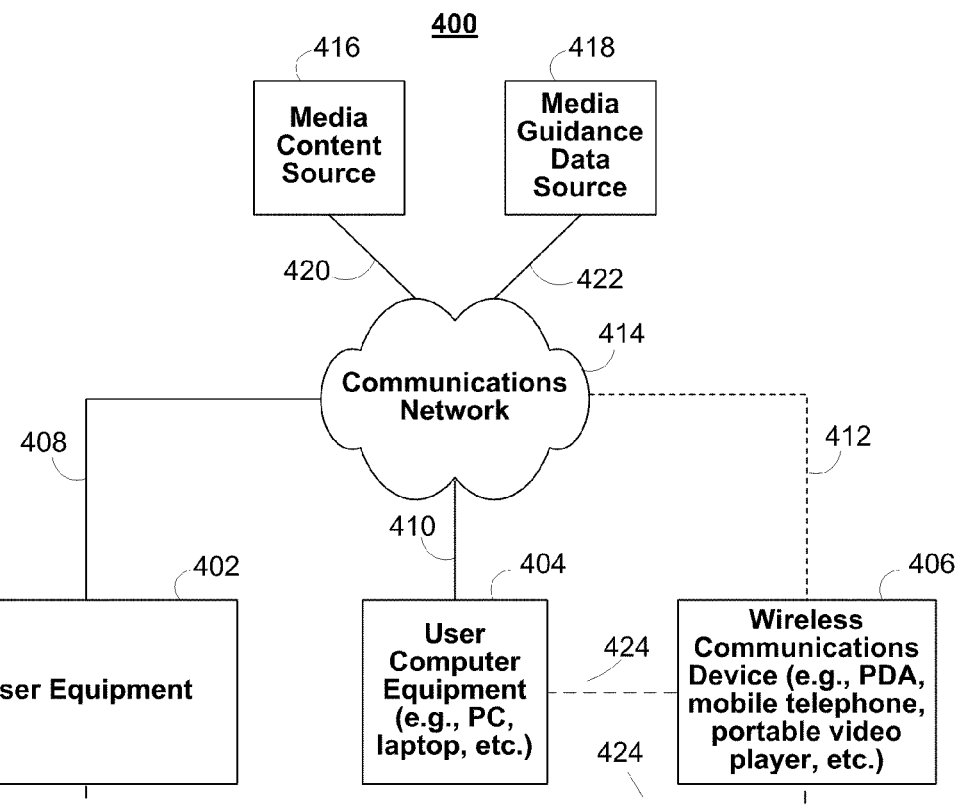
FIG. 12 shows a simplified diagram of an illustrative interactive media system in accordance with an embodiment of the invention.

User equipment device 300 of FIG. 11 can be implemented in system 400 of FIG. 12 as user equipment 402, user computer equipment 404, or any other type of user equipment suitable for accessing media, such as a non-portable gaming machine. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

User equipment 402 may include a set-top box, an integrated receiver decoder (IRD) for handling satellite television, a television set, a digital storage device, a DVD player/recorder, a Bluray player/recorder, a video-cassette recorder (VCR), a local media server, a webcam, one more security cameras, which may include one or more baby monitoring cameras, a GPS navigation unit, a network capable thermometer, or other user equipment. The GPS navigation unit may be a stand alone portable navigation unit, or alternatively, may be a navigation unit part of an automobile's navigation system. Additionally, any of the devices included in user equipment 402 may be network capable and may communicate over a network using for example, a Wi-Fi link. For example, devices included in user equipment 402 may be Digital Living Network Alliance$^{SM}$ (DLNA) compliant. In some embodiments, the devices included in user equipment 402 may additionally be capable of communicating over a short range link such as Bluetooth or IR. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless communications device 406 may include PDAs, a mobile telephone (e.g., a smartphone with a touchscreen interface), a portable video player, a portable music player, a portable gaming machine, or other wireless devices. Wireless communications device 406 may function as a remote controller of user equipment 402 and user computer equipment 404.

It should be noted that with the advent of television tuner cards for PC's, WebTV, and the integration of video into other user equipment devices, the lines have become blurred when trying to classify a device as one of the above devices. In fact, each of user equipment 402, user computer equipment 404, and wireless communications device 406 may utilize at least some of the system features described above in connection with FIG. 11 and, as a result, include flexibility with respect to the type of media content available on the device. For example, user equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless communications devices.

In system 400, there is typically more than one of each type of user equipment device but only one of each is shown in FIG. 12 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user equipment 402, user computer equipment 404, and wireless communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 12 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 12 to avoid overcomplicating the drawing.

User equipment devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. For example, wireless communication device 406 may transmit and receive remote control commands to and from user equipment 402 via infrared. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 12 to avoid overcomplicating the drawing. In addition, there may be more than one of each of media content source 416 and media guidance data source 418, but only one of each is shown in FIG. 12 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel).

Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, standalone applications implemented on user equipment devices. In other embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

Media guidance system 400 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 12.

In one approach, user equipment devices may communicate with each other within a home network. User equipment devices can communicate with each other directly via short-range point-to-point communication schemes describe above, via indirect paths through a hub, router or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device (e.g., wireless communications device 406). For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 416 to access media content. Specifically, within a home, users of user equipment 404 and user computer equipment 406 may access the media guidance application to navigate among and locate desirable media content. Users may also access the media guidance application outside of the home using wireless communications devices 406 to navigate among and locate desirable media content.

It will be appreciated that while the discussion of media content has focused on video content, the principles of media guidance can be applied to other types of media content, such as music, images, etc.

As used herein, a "primary" application is intended to mean an interactive application that runs on user equipment 402 and/or user computer equipment 404. A primary application may be a server application that provides application data to wireless communications device 406 in response to one or more application communications, or may be a version of an application that works cooperatively with a version of the application that runs on wireless communications device 406. As used herein, a "secondary" application is intended to mean an interactive application that runs on wireless communications device 406. A secondary application may include a client application that obtains data from a primary application, or may be a version of an interactive application that runs cooperatively with a primary application and that obtains application data from media content source 416 or media guidance data source 418.

The primary and secondary applications may communicate by exchanging one or more application communications. Application communications may include any client-server or peer-to-peer communication construct suitable for exchanging interactive application data or other data (such as digital frames and display screens for display by wireless communications device 406) between the primary and secondary applications via communications path 424 or via communications network 414 through communications paths 412 and 408. Communications path 424 may be an infrared link, a Wi-Fi link, a Bluetooth link, a combination of such links, or any other suitable wireless communications link. Application communications may include, for example, requests, commands, messages, or remote procedure calls.

Application communications may also involve complex communications between application constructs running on wireless communications device 406 and user equipment 402 and/or user computer equipment 404. Application communications may, for example, be object based. Objects running in the primary and secondary guides, for example, may communicate using an Object Request Broker (ORB). Interactive application data may, for example, be encapsulated as component object model (COM) objects and persisted to a stream that is transmitted over communications path 424 and/or communications network 414. Application communications may also include, for example, HTML formatted markup language documents (e.g., Web pages), that are exchanged between wireless communications device 406 and an Internet service system.

User equipment 402 (and user computer equipment 404) and wireless communications device 406 may communicate over communications path 424. There may only be a single communications path 424, such as when wireless communications device 406 obtains application data exclusively from user equipment 402. Communications path 424 may be a direct link between wireless communications device 406 and user equipment 402 and user computer equipment 404, such as for example, Bluetooth or infrared. Alternatively, when using Wi-Fi as communications path 424, communications path 424 may be routed through for example, a wireless router (not shown) included in a home network. To avoid overcomplicating the drawing, only direct communications paths 424 are shown. Additionally or alternatively, wireless communications device 406 may obtain application and media content data directly from media content source 416 or media guidance data source 418 via, for example, communications network 414.

Various different media and schemes may be used on different communications paths 424 when there are multiple communications paths 424. In the home, for example, communications path 424 may include an RF, Wi-Fi, infrared or Bluetooth link instead of a more complicated link that is better suited for data transmission over wider geographical areas. It may also be more suitable, for example, that when wireless communications device 406 communicates directly with media content source 416 or media guidance data source 418, communications path 424 may be a link more suited for data transmission over wider geographical areas, such as an Internet link.

Wireless communications device 406, user equipment 402, and user computer equipment 404 may communicate using any suitable network and transport layer protocols. They may communicate, for example, using a protocol stack which includes Sequenced Packet Exchange/Internetwork Packet Exchange (SPX/IPX) layers, Transmission Control Protocol/Internet Protocol (TCP/IP) layers, AppleTalk Transaction Protocol/Datagram Delivery Protocol (ATP/DDP) layers, a Wireless Access Protocol (WAP) layer, or any other suitable network or transport layer protocols. Wireless communications device 406 and user equipment 402 may also be part of an in-home network using, for example, the Jini networking protocol by Sun Microsystems. Network and transport layer protocols may be omitted from the system if desired. In various embodiments, wireless communications device 406 and user equipment 402 may be DLNA and UVNP compliant devices.

Application data may be distributed by media guidance data source 418 to user equipment 402 exclusively, to user equipment 402 and wireless communications device 406 jointly, or to just wireless communications device 406, using any suitable scheme. For example, application data may be provided in a continuous stream or may be transmitted at a suitable time interval (e.g., once per hour). If transmitted continuously, it may not be necessary to store the data locally on user equipment 402 or wireless communications device 406. Rather, user equipment 402 or wireless communications device 406 may extract data "on the fly" as it is needed. If desired, media content source 416 or media guidance data source 418 may poll user equipment 402 or wireless communications device 406 periodically for certain information (e.g., pay program account information or information regarding programs that have been purchased and viewed using locally-generated authorization techniques). Application data may also be provided using a suitable client-server approach or the Internet.

In various embodiments, a primary application may run totally on user equipment 402 and/or user computer equipment 404. A secondary application running on wireless communications device 406 may obtain application data via user equipment 402 and/or user computer equipment 404. The secondary application may obtain application data from a primary application acting as a server via application communications sent to user equipment 402 or user computer equipment 404 via communications path 424. In another suitable approach, the secondary application may obtain application data directly from user equipment 402 or user computer equipment 404 without involving the primary application.

User equipment 402 may, for example, receive application data as part of a continuous data stream, periodically, or in response to polling requests from media content source 416 or media guidance data source 418. In such approaches, application data may be automatically provided to wireless communications device 406 without requiring the secondary application to request it from the primary application.

In still another suitable approach, application data may be stored by user equipment 402 and forwarded to wireless communications device 406. This approach may be desirable when, for example, the transfer rates of data between distribution facility 104 and user equipment 402, and between user equipment 402 and wireless communications device 406 are unequal.

Figure 13:
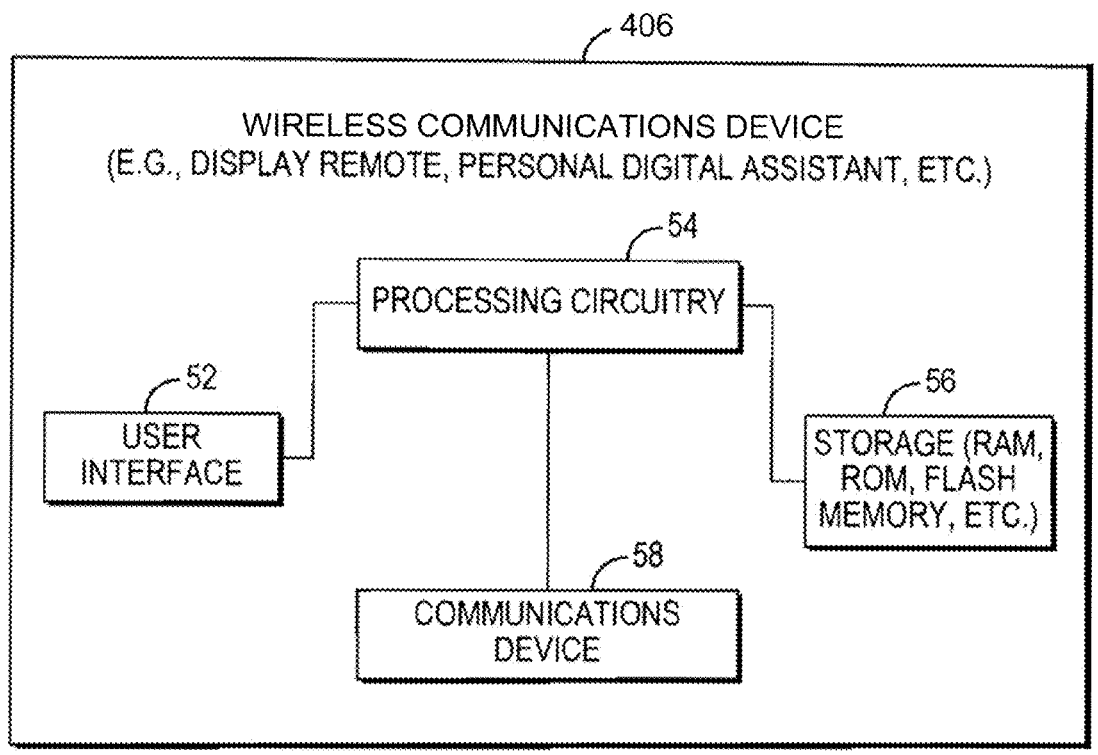
FIG. 13 shows a schematic view of the wireless communications device of FIG. 12, in accordance with an embodiment of the present invention.

An illustrative arrangement for wireless communications device 406 is shown in FIG. 13. Wireless communications device 406 may be any suitable PDA, mobile telephone, portable video player, portable music player, portable gaming machine, or other portable wireless device. The functionality that wireless communications device 406 may provide to the user may vary depending on its processing circuitry, communications circuitry and memory. Wireless communications device 406 may be a Windows CE compliant or JAVA-based hand-held PDA style device or smartphone, or may be enabled by any other suitable software operating system for wireless communications devices. Wireless communications device 406 may include user interface 52, processing circuitry 54, storage 56, and communications device 58.

User interface 52 may be any suitable input or output device or system, and may include a liquid crystal display (LCD), touch sensitive screen, voice recognition and synthesis circuitry, microphone, speaker, manual buttons or keys, keyboard, or any other suitable user input or output hardware and software. User interface 52 preferably includes a touch sensitive screen or keypad. A touch sensitive screen may simplify navigation within various types of interactive television applications. In some embodiments a touch sensitive screen of wireless communications device 406 need only display those buttons or controls that apply to the specific screen that the user is viewing or the specific task that the user is performing. In addition, an interface displayed on a touch sensitive screen may change to suit the type of data entry the user is going to perform in the television application. For example, a keyboard may be displayed to provide a user with an opportunity to enter one or more characters, or a number pad may be displayed to simplify numeric entries. User interface 52 may also include suitable handwriting recognition software for running on a wireless communications device.

In still another suitable approach, wireless communications device 406 may have a combination of push buttons and displays. The displays may label each push button with text or graphics to indicate to the user the feature associated with a push button. When the user accesses different interactive applications, the displays may change based on the application accessed.

When, for example, an interactive wagering application is accessed, two displays may read "bet" and "info." When the user changes applications to, for example, an interactive program guide, the same displays may read "channel up" and "channel down." For each application, pressing a given push button results in performing the indicated feature. Control codes may be downloaded from, for example, user equipment 402 (FIG. 12) via a Bluetooth, infrared, Wi-Fi, or other wireless link to wireless communications device 406 to indicate to wireless communications device 406 the proper labels and features for each push button.

Processing circuitry 54 may include any suitable processor, such as an Intel Pentium®, AMD, or other microprocessor. Wireless communications device 406 may also include storage 56. Storage 56 may be any suitable memory or other storage device, such as RAM, ROM, flash memory, magnetic or optical disc drive or other storage suitable for a wireless communications device. Processing circuitry 54 may also include suitable circuitry so as to display video. A video signal may be streamed, for example, as an MPEG-2 data stream to wireless communications device 406 via a Wi-Fi or Bluetooth link.

Wireless communications device 406 may also include communications device 58. Communications device 58 may be any device suitable for supporting communications between wireless communications device 406 and user equipment 402 over communications path 424 (FIG. 12) and between wireless communications device 406 (FIG. 12) and media content source 416 (FIG. 12) and media guidance data source 418 (FIG. 12) over communications path 412 (FIG. 12). Communications device 58 may be, for example, a communications port (e.g., a serial port, parallel port, universal serial bus (USB) port, etc.), modem (e.g., any suitable analog or digital standard modem or cellular modem), network interface card (e.g., an Ethernet card, token ring card, etc.), wireless transceiver (e.g., an infrared, radio, cellular, or other suitable analog or digital transceiver), or other suitable communications device for a wireless communications device. In particular, communications device 58 may be a paging-frequency transceiver. If desired, wireless communications device 406 may include multiple communications devices 58. One communications device 58 may be used to communicate over communications path 412, and another may be used to communicate over communications path 424. Each communications device 58 may be for a different type of communications path. For example, one communications device 58 may be used to download application data or otherwise exchange access communications, and another communications device, such as an infra-red emitter, may be used to control user equipment 402 and other home entertainment equipment using infra-red controls. A paging-frequency emitter may be used, for example, to upload device type information and download infra-red codes. When used in this mode, keys may be displayed on wireless communications device 406, and the user may touch the keys on the screen to generate commands. The keys may be context sensitive, where only the keys of interest are displayed at any time.

In operation, wireless communications device 406 may obtain user commands from user interface 52, process the commands using processing circuitry 54, and output a suitable display screen to the user on user interface 52. When a user indicates a desire to access a function of the secondary application that requires the application to obtain application data, processing circuitry 54 may direct communications device 58 to initiate a session with user equipment 402 (FIG. 12), media content source 416 (FIG. 12) or media guidance data source 418 (FIG. 12).

Wireless communications device 406 may be configured to display, for example, a main menu, which may include interactive advertisements. One of the items on the menu may be an interactive program guide. Selecting the guide feature may bring up a guide main menu, display of program listings or any other suitable guide display. When a user selects a listing, the device may display a description of a program associated with the listing. Advertisements may be programming related, in which case selecting them may bring up more information about a program, allow reminders to be set, or any other suitable function. Advertisements for other products may allow a user to get more information or purchase a product.

Figure 14:
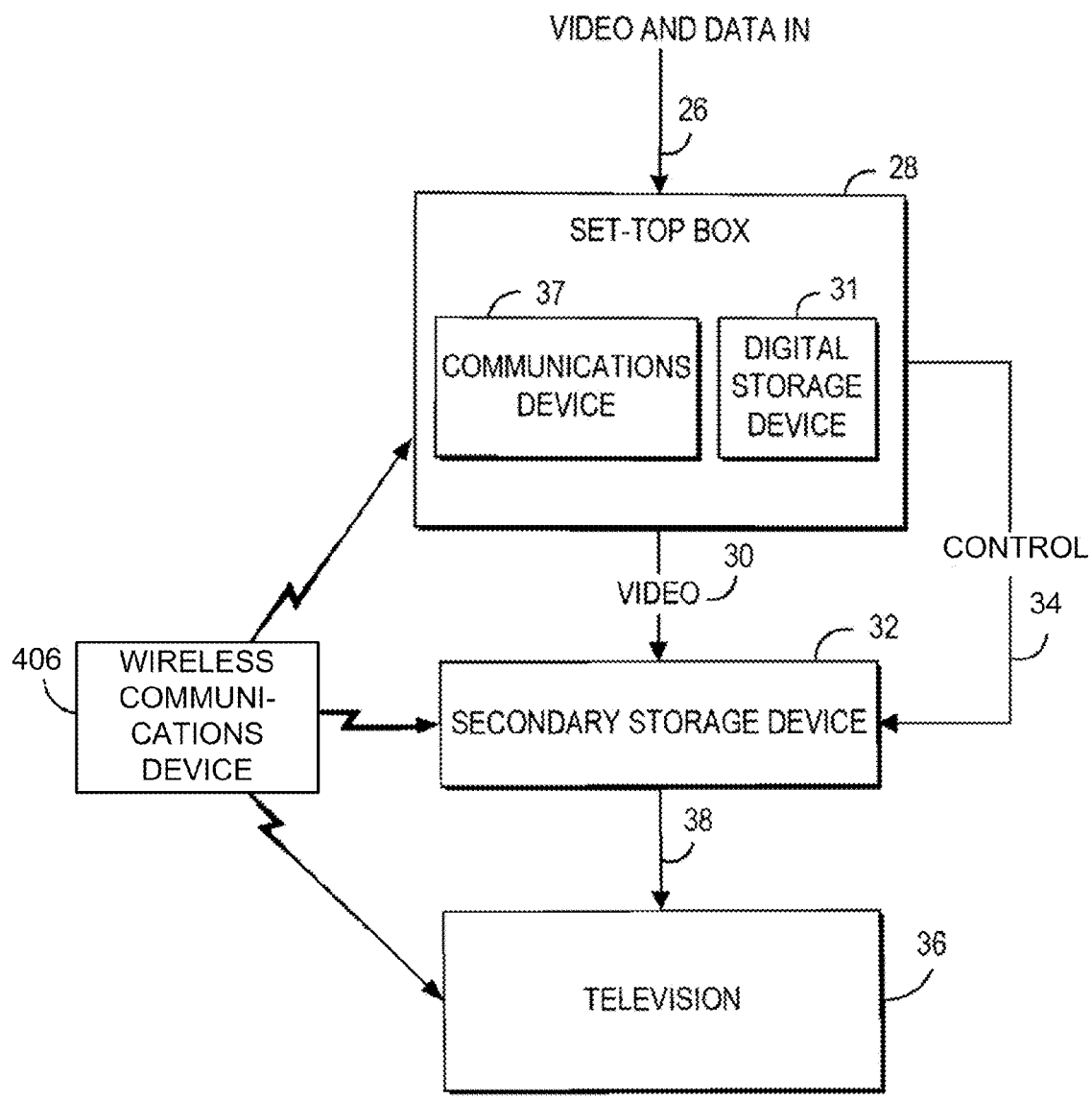
FIG. 14 shows a schematic view of the user equipment of FIG. 12, in accordance with an embodiment of the present invention.

An illustrative arrangement for user equipment 402 (FIG. 12) is shown in FIG. 14. User equipment 402 (FIG. 12) may receive analog video or a digital video stream from media content source 416 at input 26. Data from media guidance data source 418 may also be received at input 26. During normal television viewing, the user may tune user equipment (e.g., a set top box 28) to a desired television channel (analog or digital). The signal for that television channel may then be provided at video output 30. The signal supplied at output 30 is typically either a radio frequency (RF) signal on a predefined channel (e.g., channel 3 or 4), or a analog demodulated video signal, but may also be a digital signal provided to television 36 on an appropriate digital bus (not shown). The video signal at output 30 may be received by optional secondary storage device 32.

A primary application or primary application client may run on set-top box 28, on television 36, on optional digital storage device 31 (if television 36 or optional digital storage device 31 has suitable processing circuitry and memory), or on a suitable analog or digital receiver connected to television 36. The interactive television application may also run cooperatively on both television 36 and set-top box 28. Interactive television application systems in which a cooperative interactive television program guide application runs on multiple devices are described, for example, in Ellis U.S. patent application Ser. No. 09/186,598, filed Nov. 5, 1998, which is hereby incorporated by reference herein in its entirety.

Secondary storage device 32 can be any suitable type of analog or digital program storage device or player (e.g., a videocassette recorder, a digital versatile disc (DVD) player, etc.). Program recording and other features may be controlled by set top box 28 using control link 34. If secondary storage device 32 is a videocassette recorder, for example, a typical control link 34 involves the use of an infrared transmitter coupled to the infrared receiver in the videocassette recorder that normally accepts commands from a remote control.

Wireless communications device 406 may be used to control set top box 28, secondary storage device 32, and television 36. Wireless communications device 406 may, for example, have different operation modes for operating as an interface to applications and for controlling user equipment 402 (FIG. 12) like a remote control. Wireless communications device 406 may be programmable based on, for example, the devices in media system 400 (FIG. 12). The user may, for example, select device types from within a suitable setup display. In another suitable approach, wireless communications device 406 (FIG. 12) may download configuration information from an application (e.g., an interactive media guidance application) running on user equipment 402.

If desired, the user may record programs, application data, or a suitable combination thereof in digital form on optional digital storage device 31. The user may also download software to digital storage device 31 from the Internet or some other medium. Digital storage device 31 may be a writeable optical storage device (such as a DVD player capable of handling recordable DVD discs), a magnetic storage device (such as a disk drive or digital tape), or any other digital storage device. Interactive television application systems in which program guides have digital storage devices are described, for example, in Hassell et al. U.S. patent application Ser. No. 09/157,256, filed Sep. 17, 1998, which is hereby incorporated by reference herein in its entirety.

Digital storage device 31 may be contained in set-top box 28 or it may be an external device connected to set-top box 28 via an output port and appropriate interface. If necessary, processing circuitry in set-top box 28 formats the received video, audio and data signals into a digital file format. Preferably, the file format is an open file format such as the Moving Pictures Expert Group (MPEG) MPEG-2 standard or the Moving Joint Photographic Experts Group (MJPEG) standard. The resulting data may be streamed to digital storage device 31 via an appropriate bus (e.g., a digital bus), and may be stored on digital storage device 31. In another suitable approach, an MPEG-2 data stream or series of files may be received from media content source 416 (FIG. 12) and stored in digital storage device 31. For example, files from programs recorded by the user using a remote media server at media content source 416 (FIG. 12) may be stored. Such digital files may be played back to the user when desired.

Television 36 may receive video signals from secondary storage device 32 via communications path 38. The video signals on communications path 38 may either be generated by secondary storage device 32 when playing back a prerecorded storage medium (e.g., a videocassette or a recordable digital video disc), by digital storage device 31 when playing back a pre-recorded digital video (e.g., a video for a program that was recorded by the user at a media server remote to or within the user's home), may be passed through from set top box 28, may be provided directly to television 36 via set-top box 28 if secondary storage device 32 is not included in user equipment 402, or may be received directly by television 36. During normal television viewing, the video signals provided to television 36 correspond to the desired channel to which the user has tuned with set top box 28. Video signals may also be provided to television 36 by set-top box 28 when set-top box 28 is used to play back information stored on digital storage device 31, or when set-top box 28 is used to decode a digital video stream, or digital files transmitted from television distribution facility 29.

Set-top box 28 may include communications device 37 for communicating directly with media content source 416 (FIG. 12) and media guidance data source 418 (FIG. 12) over communications path 408, or with wireless communications device 406 over communications path 424 (FIG. 12). Communications device 37 may be, for example, a communications port (e.g., a serial port, parallel port, universal serial bus (USB) port, etc.), modem (e.g., any suitable analog or digital standard modem or cellular modem), network interface card (e.g., an Ethernet card, token ring card, etc.), wireless transceiver (e.g., an infrared, radio, cellular, Bluetooth, or other suitable analog or digital transceiver), or other suitable communications device. Television 36 may also have such a suitable communications device if desired. In particular, communications device 37 may be a paging-frequency or 900 MHz transceiver. If desired, set-top box 28 may have multiple communications devices 37. One communications device 37 may be used to communicate with distribution facility 104, and another may be used to communicate with wireless communications device 406.

The primary and secondary applications may include any suitable applications including, without limitation, an interactive program guide application, a home shopping application, web-browser, to-do list, wagering application, or any other application. For clarity, the present invention will be illustrated in connection with a system in which an interactive program guide application is implemented on user equipment 402 (FIG. 12) and wireless communications device 406 (FIG. 12). In one suitable arrangement for such a system, program guide data is distributed from media guidance data source 418 (FIG. 12) to an interactive program guide application implemented on user equipment 402 (FIG. 12). In another suitable arrangement, the interactive program guide application may be implemented using a client-server architecture in which the primary processing power for the application is provided by a server located at, for example, media guidance data source 418, and user equipment 402 acts as a client processor. In still another alternative arrangement, the interactive program guide application may obtain program guide data from the Internet.

Interactive program guides typically limit a user's ability to select interactive objects on a screen by requiring that objects be selected by positioning a highlight region or cursor over the objects. When, for example, a user is within a column of program listings, the user may not arrow above or below the column to select an interactive object. In addition, the user may be required to perform several key strokes to navigate from one object to another. On the touch sensitive display of wireless communications device 406, however, any area can be selectable, thereby providing the user with an increased ability to access interactive objects. Wireless communications device 406 may, for example, display a menu modeled after a menu displayed on user equipment 402 (FIG. 12) by an interactive application. The user may select a particular menu option with a single action without having to perform, as with a regular remote control, multiple keystrokes to position a highlight region.

Wireless communications device 406 (FIG. 12) may include many of the features of interactive program guides, such as listings by time, by channel, by category, favorite channels or any other guide feature. It may allow the user to set reminders and have them appear on the device, with both an audio alert and a display. Via a paging return, for example, the device can be used to set reminders or schedule recordings remotely. Wireless communications device 406 (FIG. 12) may be used for collecting data. For example, it might be used to send out surveys. It may also be used to collect audience ratings information. With an appropriate point-of-purchase device, for example, may be used to distribute electronic coupons.

The secondary program guide application running on wireless communications device 406 may provide a user with an opportunity to coordinate the functions of the primary guide with the functions of the secondary guide, thereby extending the interactivity of the primary and secondary guides.

The touch sensitive display of wireless communications device 406 becomes an integrated part of the on-screen guide. Complimentary interactivity between the primary and secondary guides may be provided for various program guide functions without interrupting television viewing. For example, browsing through channels and times, accessing program information, ordering pay-per-view programs, setting reminders, and locking programs may all be performed by the user with wireless communications device 406 (FIG. 12) without interrupting the content being displayed on television 36.

Moreover, when a user is browsing program guide listings displayed on user equipment 402 (FIG. 12) (e.g., television 28), and selects a program listing 108 (FIG. 9), wireless communications device 406 (FIG. 12) may display information screen 801 which may include rich graphics, video, and/or advertisements. The information displayed in information screen 801 may be transferred to wireless communications device 406 (FIG. 12) from e.g., set-top box 28 (FIG. 14) over communications path 424 (FIG. 4). Additionally, in various embodiments, while a user browses program guide listings displayed on user equipment 402 (FIG. 4) (e.g., television 28 (FIG. 14)) as shown in FIG. 9, wireless communications device 406 (FIG. 4) may display the video being displayed in video region 122 (FIG. 9). The video may be streamed from user equipment 402 (FIG. 12) (e.g., set-top box 28 (FIG. 14)) to wireless communications device 406 (FIG. 12) over communications path 424 (FIG. 12).

Figure 15:
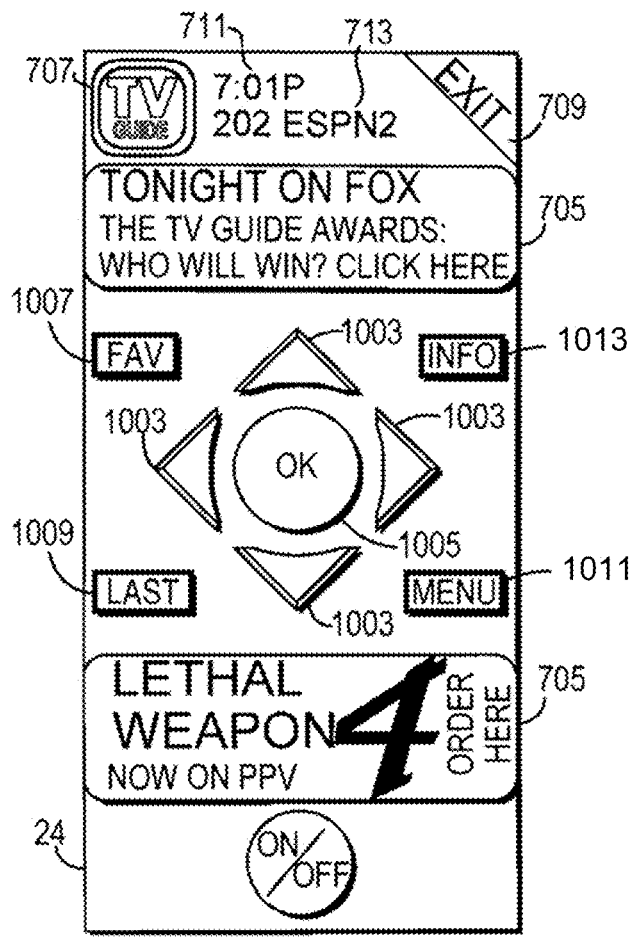
FIG. 15 shows an illustrative remote screen in accordance with an embodiment of the present invention.

The secondary guide may provide a user with an opportunity to navigate within the primary guide and access features of the primary guide using wireless communications device 406. FIG. 15 shows an illustrative remote screen 1000. Remote screen 1000 may include, for example, logo 707, selectable advertisements 705, current time 711 and current channel 713. When a user selects logo 707 from within remote screen 1000, the secondary guide may instruct the primary guide to display a program listings screen on television 36. The controls of remote screen 1000 may be based on and displayed according to the screen displayed by a primary guide or other application, the option highlighted on a particular primary application screen, the content or type of information displayed in a primary application screen, or any other suitable feature, group of features, or content.

Figure 16:
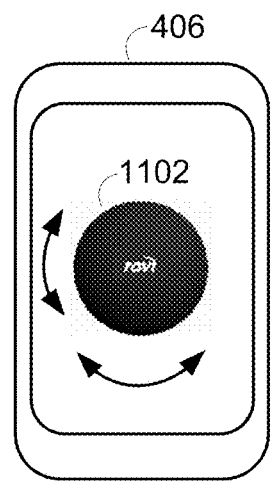
FIG. 16 shows an illustrative remote screen in accordance with an embodiment of the present invention.

The user may navigate and control a primary guide by, for example, touching arrows 1003. Navigation within a program guide display screen using wireless communications device 406 may be performed within any primary guide display screen. Alternatively, in some embodiments, the user may navigate and control a primary guide by using an on-screen trackball 1102 as shown in FIG. 16. Trackball 1102 may be rotated horizontally and vertically and the user may "tap" trackball 1102 to select objects or buttons within the primary guide. User equipment 402 (FIG. 12) e.g., a television, may display corresponding actions in the primary guide display screen as the user moves trackball 1102. Various graphical interfaces for an interactive media guidance application which may be navigated and controlled using the onscreen trackball shown in FIG. 16 are discussed in, for example, Woods, et al., U.S. patent application Ser. No. 12/571,069, filed Sep. 30, 2009, which is hereby incorporated by reference herein in its entirety.

The secondary program guide may provide a user with an opportunity to navigate within the primary program guide in other ways. The secondary guide may provide a user with an opportunity to set channels as favorites on the secondary guide, the primary guide, or both. The user may, for example, navigate between listings set as favorites by touching "FAV" 1007. Alternatively, the secondary guide may re sort program listings with the favorite channels in the most prominent or convenient position as displayed on wireless communications device 406 (FIG. 12) or user equipment 402 (FIG. 12).

The user may back up one previous primary guide display screen by, for example, touching "LAST" 1009. The user may return to primary guide main menu screen 100 by, for example, touching "MENU" 1011. The user may return to watching television by, for example, touching "EXIT" 709. A user may indicate a desire to view program information for a particular listing by, for example, positioning highlight region 150 over the listing and touching "INFO" 1013. Other illustrative controls that may be displayed by the secondary guide on wireless communications device 406 when a user highlights a program listing from within a listings screen or other display screen may include controls for: setting a reminder, locking a program, ordering the program if it is a pay-per-view, seeing other air times of the program, or ordering program-related merchandise such as a CD of the soundtrack, a videotape of the program, or apparel carrying the program's brand.

In some embodiments, video displays may also be streamed to wireless communications device 406 (FIG. 12) as a user browses through program listings using the primary guide. In this approach, the video display may include video for a program that has its listing displayed and that is being broadcasted at the time of the browse. If system resources do not permit the streaming of video, still shots may be transmitted from user equipment 402 (FIG. 12) to wireless communications device 406 (FIG. 12) for display instead. In another suitable approach, highly compressed videos may be used to account for bandwidth constraints. Using highly compressed videos may also be desirable when, for example, the resolution of the display of wireless communications device 406 (FIG. 12) would not support high-resolution video.

Additionally, in various embodiments, the user may watch a program on user equipment 402 (FIG. 12) while watching a different program on wireless communications device 406 (FIG. 12). For example, a program may be streamed from a media-server to wireless communications device 406 (FIG. 12) while a different program may be provided by set-top box 28 (FIG. 14) to television 36 (FIG. 14). Additionally, set-top box 28 may include multiple tuners, and one tuner may be used to receive one program, and another tuner may be used to receive a second program. Accordingly, the user may view one program on television 36 (FIG. 14), and the second program may be streamed using the Wi-Fi link to wireless communications device 406 (FIG. 12). Wireless communications device 406 (FIG. 12) may be used to set priorities for the multiple tuners in the event of a conflict. For example, if the user is viewing different programs on television 36 (FIG. 14) and wireless communications device 406 (FIG. 12), and one of the tuners is scheduled to record a program, the user may allow the recording and stop the streaming to wireless communications device 406 (FIG. 12). Alternatively, the user may override the scheduled recording (e.g., reduce the priority of the recording) to be able to continue streaming to wireless communications device 406 (FIG. 12).

Wireless communications device 406 (FIG. 12) may provide the user with an option to switch the programs being displayed on the respective screens. For example, during a commercial in the program being displayed on television 36, the user may "tap" a button on wireless communications device 406 (FIG. 12) to switch the programs being displayed on television 36 (FIG. 14) and wireless communications device 406 (FIG. 12). At the end of the commercial, the user may touch the button again to switch the programs being displayed on television 36 (FIG. 14) and wireless communications device 406 (FIG. 12).

Figure 17:
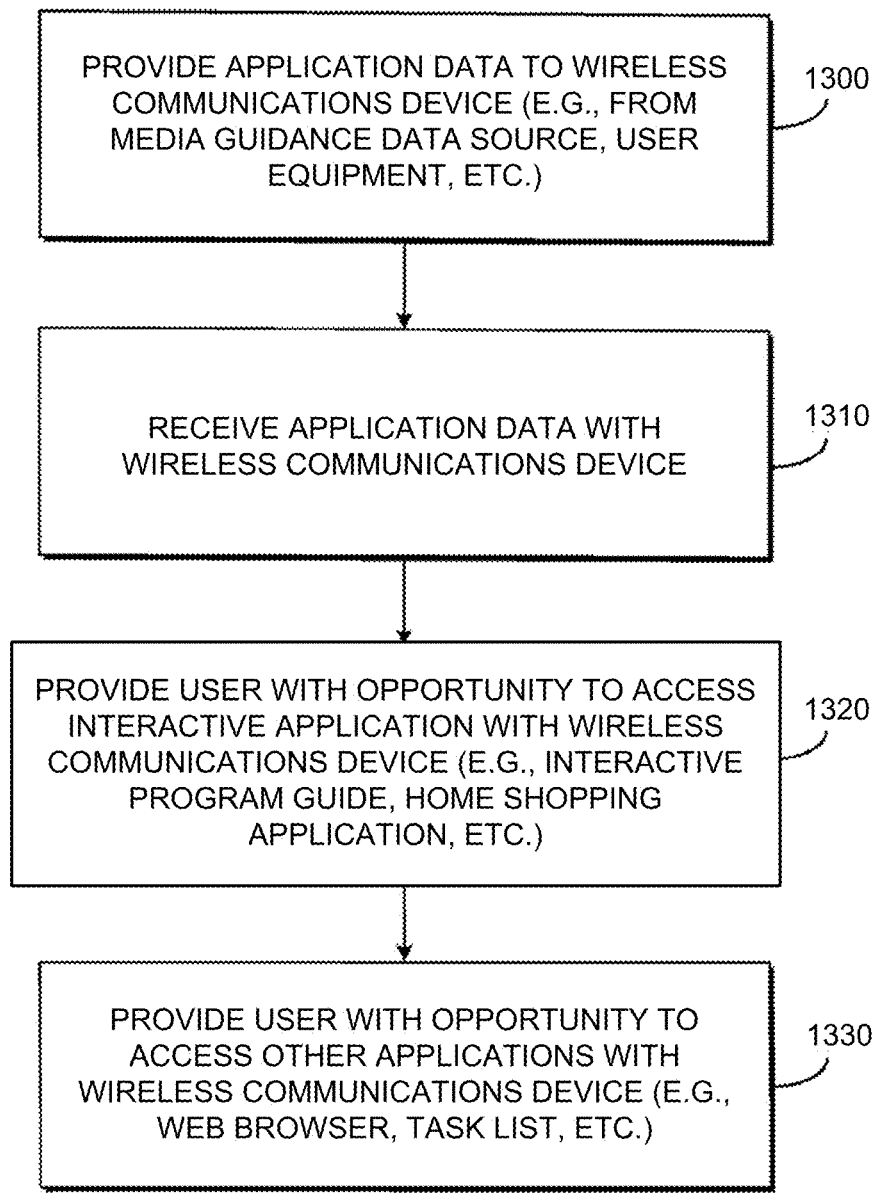
FIG. 17 is a flowchart of illustrative steps involved in providing interactive media guidance and other application features with the wireless communications device of FIG. 12 in accordance with an embodiment of the present invention.

FIGS. 17-21 are flowcharts of illustrative steps involved in providing stand-alone and coordinated application features on wireless communications device 406 (FIG. 12). The steps shown in FIGS. 17-21 are illustrative and in practice may be performed in any suitable order. FIG. 17 is a flowchart of illustrative steps involved in providing interactive television and other application features with wireless communications device 406 (FIG. 12). At step 1300, application data, such as interactive television application data or data for other applications, is provided to wireless communications device 406. The data may be provided directly from media guidance data source 418 (FIG. 12) to wireless communications device 406 (FIG. 12), media guidance data source 418 (FIG. 12) to wireless communications device 406 (FIG. 12) via user equipment 402 (FIG. 12), or directly from user equipment 402 (i.e., data that originates from user equipment 402). The interactive television application data may include any data suitable for interactive media guidance or other applications. Interactive media guidance applications may include, for example, applications that provide information related to programming or that provide interactive features associated with programming, such as, for example, interactive television program guides, home shopping applications, e-mail, wagering and financial trading applications. As illustrative examples, home shopping applications and financial trading applications may be interactive applications when features of such applications are provided via user equipment. The features of these applications may be provided with programming related to the features. A home shopping application may, for example, provide purchasing opportunities for products and services featured on a home shopping television channel.

Wireless communications device 406 (FIG. 12) may receive application data (step 1310) and provide a user with an opportunity to access the media guidance application with wireless communications device 406 (step 1320). The interactive media guidance application may run as a stand alone application, as a client that requests data from a server (e.g., a server at media guidance data source 418 or user equipment 402), or cooperatively with a primary application running within user equipment 402. At step 1330, wireless communications device 406 may provide the user with an opportunity to access other applications such as, for example, PDA-type functions. For example, it may support e-mail, a calendar, a contact list, web browsing, a calculator, etc. It may support data services, such as news, weather, sports, traffic, or any other suitable data service. Such applications may also be provided as stand alone or server applications running on user equipment 402 and accessible by wireless communications device 406. With suitable hardware resources, the secondary program guide might include advanced communication functions. For example, it might allow a user to remotely monitor the home equipment—find out if the system is turned on, what channel is on, etc. It might also allow a user to listen to audio from a selected TV channel, or offer audio channels.

Figure 18:
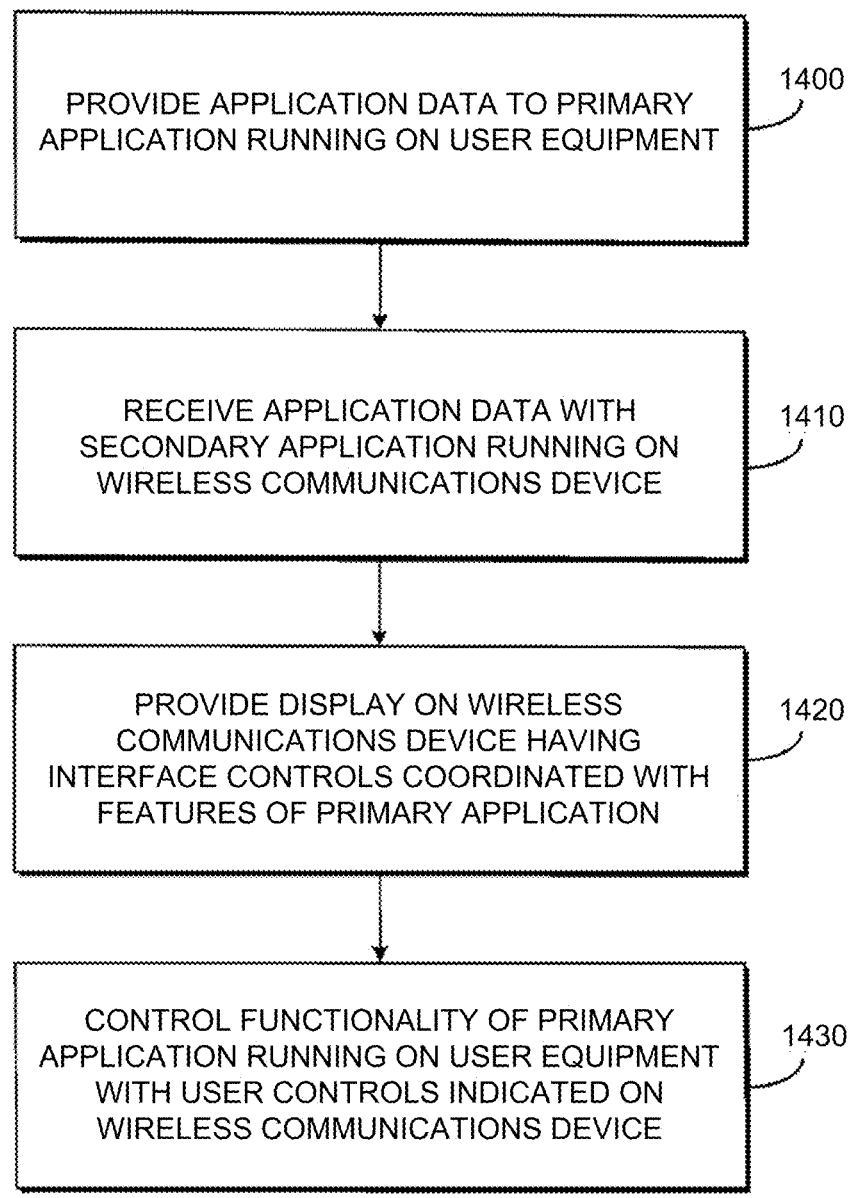
FIG. 18 is a flowchart of illustrative steps involved in coordinating features between primary applications running within the user equipment of FIG. 12 and secondary applications running on the wireless communications device of FIG. 12 in accordance with an embodiment of the present invention.

FIG. 18 is a flowchart of illustrative steps involved in coordinating features between primary applications running within user equipment 402 and secondary applications running on wireless communications device 406. At step 1400, media content source 416 or media guidance data source 418 provides application data to a primary application running on user equipment 402. The primary application may be an interactive media guidance application. At step 1410, the primary application provides the application data to a secondary application running on wireless communications device 406 using, for example, one or more communications paths (FIG. 12). At step 1420, the secondary application running on wireless communications device 406 provides a display of interface controls that are coordinated with the features of the primary application. For example, the interface controls may correspond with navigational features of the primary application. The illustrative remote screen 1000 of FIG. 15, for example, includes navigational arrows 1003 to correspond to navigational features of an interactive program guide running on user equipment 402. The user interface also includes controls for interactive guide features, such as favorites, last, more information, and menu. In a home shopping application, for example, user interface controls may include similar navigational controls, and may include other controls for home shopping features such as purchasing, information, putting items on wish lists, or any other suitable home shopping feature. In a home stock trading application for example, user interface controls may include similar navigational controls and may include other controls for features such as buying stocks, selling stocks, more information, or any other suitable feature. In a web browser application, for example, similar navigational controls and other controls for, for example, back, forward, home, bookmark, or any other suitable feature may be provided. In a wagering application, for example, user interface controls may be provided for wagering, providing additional information regarding wagering opportunities, or any other suitable feature.

The interface controls may be coordinated with the features of the secondary application using the data provided by the primary application. In this way, user interface controls may be dynamically configurable based on the primary application. If desired, a library of standard controls may be stored by wireless communications device 406 so that the user is provided with a consistent interface across primary applications. Controls that are specialized for particular primary applications may be downloaded if desired.

Another example of coordinating interface controls with features of a primary application is providing primary application content on wireless communications device 406. In an interactive program guide application, for example, wireless communications device 406 may display television programming when, for example, the user browses listings while watching a program on user equipment 402.

At step 1430, the secondary application controls the functionality of the primary application based on the user controls selected by the user as indicated on wireless communications device 406. This may be accomplished by, for example, exchanging one or more access communications with the primary application. In a home shopping application, for example, the primary application may initiate a purchase sequence in response to a user selecting a purchase control on wireless communications device 406. In a stock trading application, for example, the primary application may sell stock in response to a user selecting a sell control on wireless communications device 406. In a web browser, for example, the system may go back to a previously accessed web page in response to a user selecting a back control.

Figure 19:
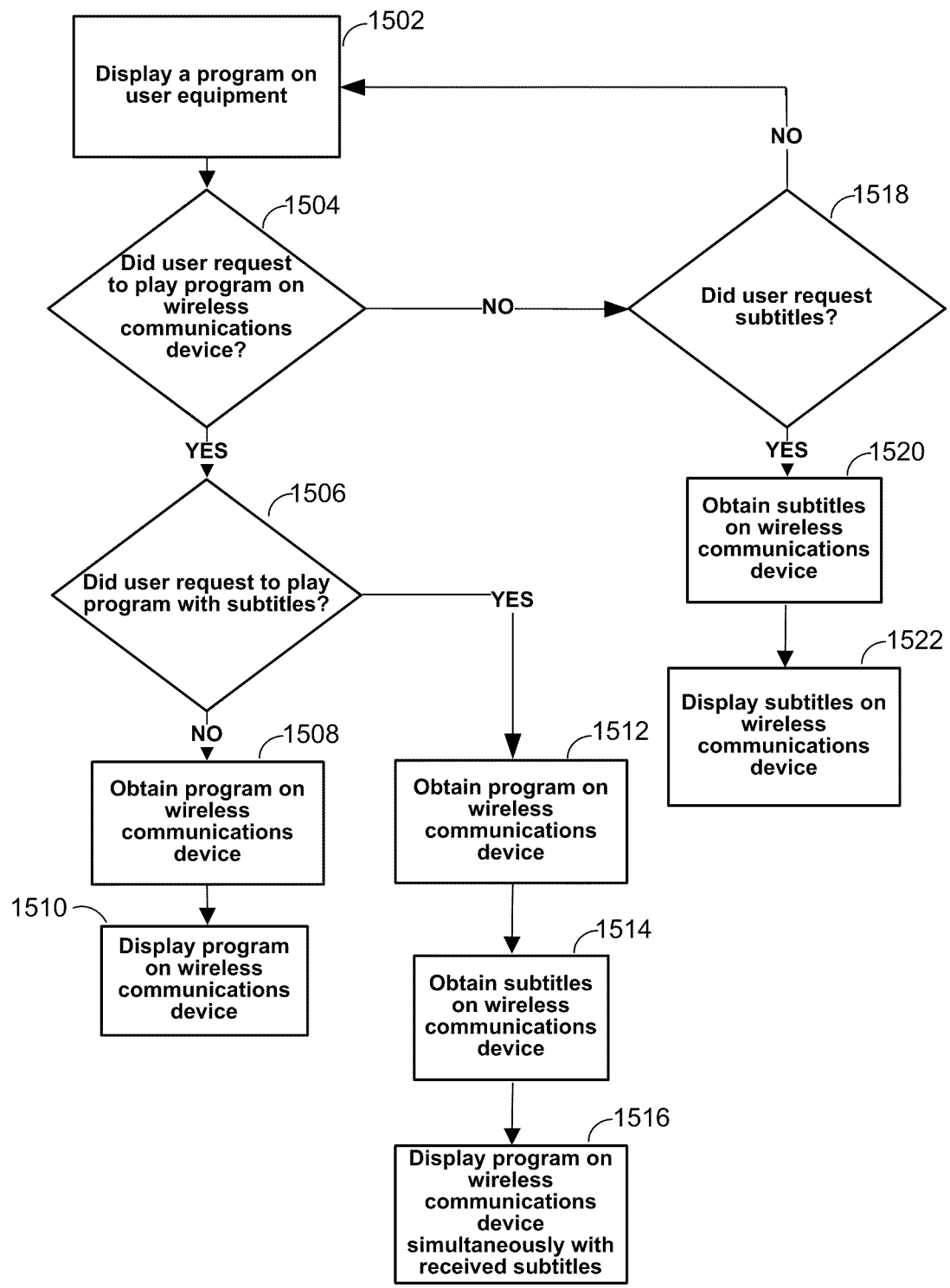
FIG. 19 is a flowchart of illustrative steps involved in providing subtitles on the wireless communications device of FIG. 12 in accordance with an embodiment of the present invention.

FIG. 19 is a flowchart of illustrative steps involved in providing subtitles and/or dubbings on wireless communications device 406 (FIG. 12). At step 1502, user equipment 402 (FIG. 12) (e.g., television 36 (FIG. 14)) may display a program selected by the user. The program may be from a channel selected by the user or may be, for example, a movie being played from a DVD. At step 1504, if the user requests to play the program on wireless communications device 406 (FIG. 12), the user may be further asked whether to display subtitles and/or to play a dubbing (step 1506). The user may request to play the program on wireless communications device 406 (FIG. 12), and request to play the program with subtitles and/or a dubbing by simply "tapping" an on-screen button displayed on wireless communications device 406 (FIG. 12). If the user does not request to play the program on wireless communications device 406 (FIG. 12), the program may continue to play on user equipment 402 (FIG. 12). If the user does not request to display subtitles and/or listen to a dubbing along with the program, wireless communications device 406 (FIG. 12) may obtain the program in step 1508 and display the program on wireless communications device 406 (FIG. 12) in step 1510. The program may be streamed from user equipment 402 (FIG. 12), e.g., set-top box 28 (FIG. 14) via communications path 424 (FIG. 12). Alternatively, if user equipment 402 (FIG. 12) is displaying a program from a service such as YouTube™, or Hulu™, wireless communications device 406 (FIG. 12) may stream the program directly from the service.

If the user does request to display subtitles and/or play a dubbing along with the program, wireless communications device 406 (FIG. 12) may obtain the program from user equipment 402 (FIG. 12) or from a service (e.g., YouTube™, Hulu™, etc) in step 1512. Additionally, wireless communications device 406 (FIG. 12) may also obtain the subtitles and/or the dubbing in step 1514. The subtitles and/or the dubbing may be obtained from user equipment 402 (FIG. 12) via communications path 424 (FIG. 12) or may be obtained from media content source 416 (FIG. 12) via communications path 412 (FIG. 12). In step 1516, wireless communications device 406 (FIG. 12) may display the program along with the received subtitles and/or the dubbing. In one embodiment, the user may wish to view the subtitles and/or listen to the dubbing on wireless communications device 406 without viewing the program on wireless communications device 406, as shown in step 1518. If so, wireless communications device 406 may obtain the subtitles and/or dubbing in step 1520, and may display the subtitles and/or play the dubbing on wireless communications device 406 in step 1522.

Figure 20:
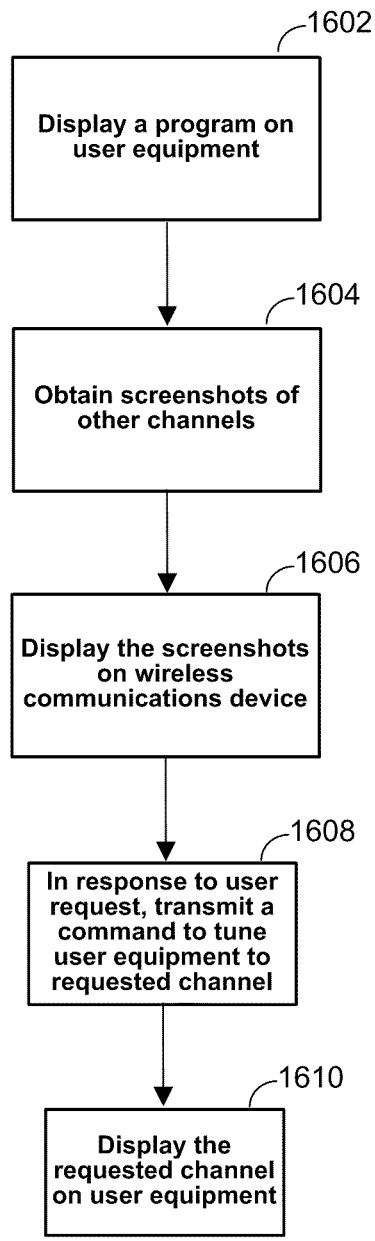
FIG. 20 is a flowchart of illustrative steps involved in providing access to screenshots of other channels on the wireless communications device of FIG. 12 in accordance with an embodiment of the present invention.

FIG. 20 is a flowchart of illustrative steps involved in displaying, on wireless communications device 406, screenshots in the surfing guide application shown in FIG. 12. In step 1602, user equipment 402 (FIG. 12) may display a program from a particular channel selected by the user. While the user is watching the program on user equipment 402, the user may wish to see what programs are playing on other channels. The user may then access the surfing guide application on wireless communications device 406 (FIG. 12). Wireless communications device 406 (FIG. 12) may then obtain screenshots of other channels in step 1604 and display the screenshots as shown in FIG. 12 in step 1606. The screenshots may be obtained from a server at media content source 416 (FIG. 12), which may be configured to periodically capture screenshots of broadcast channels and store them in a database accessible via the internet. Wireless communications device 406 (FIG. 12) may connect to the server using, for example, a Wi-Fi link in the user's home network. The user may select a screenshot by "tapping" it. Once selected, wireless communications device 406 may display the screenshot in greater detail in preview area 1206 (FIG. 12), or may display the program in preview area 1206 (FIG. 12). The program may be streamed from the server via communications path 412 (FIG. 12). Alternatively, or in addition, preview area 1206 may display a description of the program, which may also be downloaded from the server. If the user wishes to watch that program, the user may "tap" watch button 1204 (FIG. 12). Upon tapping watch button 1204 (FIG. 12), the surfing guide application may, in step 1608, exchange one or more application communications with the primary guide via communications path 424 (FIG. 12) telling the primary guide that the user has indicated a desire to tune to a particular channel. The primary guide may cause user equipment 402 (FIG. 12) to tune to the indicated channel. In another suitable approach, wireless communications device 406 (FIG. 12) may communicate directly with user equipment 402 (FIG. 12), using for example, an IR or Bluetooth link, and instruct user equipment 402 (FIG. 12) to tune to the indicated channel. In step 1610, the selected channel may be displayed on user equipment 402 (FIG. 12).

Figure 21:
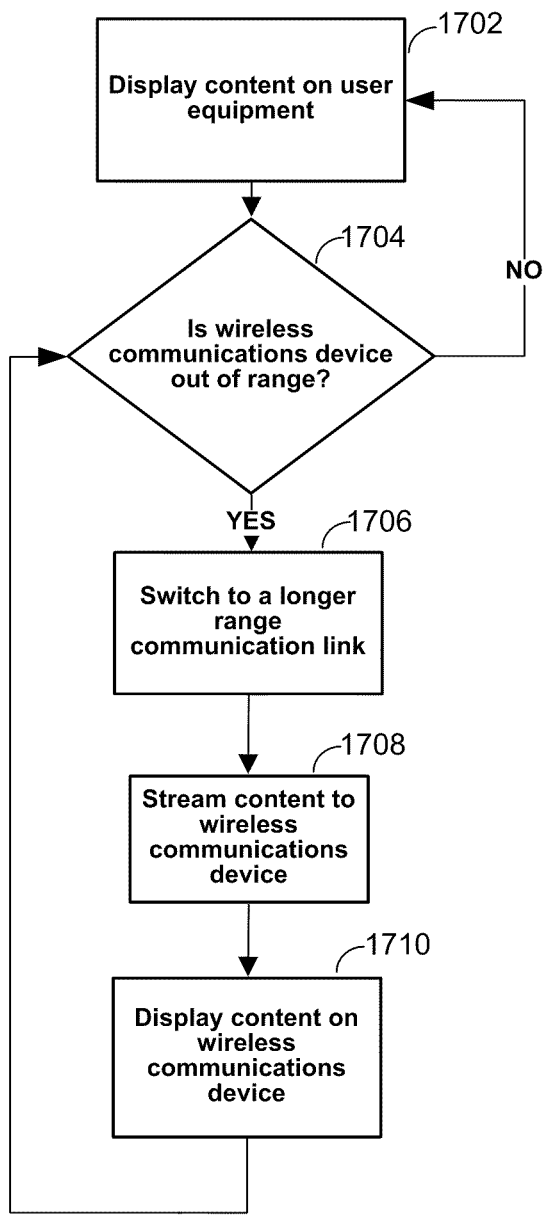
FIG. 21 is a flowchart of illustrative steps involved in automatically streaming content to the wireless communications device in accordance with an embodiment of the present invention.

FIG. 21 is a flowchart of illustrative steps involved in automatically streaming content to wireless communications device 406 (FIG. 12). In step 1702, user equipment 402 (FIG. 12) may display content on user equipment 402 (FIG. 12). The content may be a program, advertisement, or movie or may be a program guide display (e.g., listings grid as shown in FIG. 9). In step 1704, wireless communications device 406 (FIG. 12) may determine if it is out of range from user equipment 402 (FIG. 12) (e.g., television 36 (FIG. 14) or set-top box 28 (FIG. 14)). If it is not, user equipment 402 (FIG. 12) may continue to display the content. Whether wireless communications device 406 (FIG. 12) is out of range from user equipment 402 (FIG. 12) may be determined using a short range link such as infrared or Bluetooth. For example, if the user leaves the room with wireless communication device 406 (FIG. 12), the infrared (which requires a line of sight) or Bluetooth link between wireless communications device 406 (FIG. 12) and user equipment 402 (FIG. 12) will likely be broken. Alternatively, whether wireless communications device 406 (FIG. 12) is out of range from user equipment 402 (FIG. 12) may be determined by detecting the location of the wireless communications device 406 (FIG. 12) using, for example, RFID or GPS.

Thus, if it is determined that wireless communications device 406 (FIG. 12) is out of range from user equipment 402 (FIG. 12), wireless communications device 406 (FIG. 12) may, in step 1706, switch to a longer range link such as Wi-Fi. In step 1708, wireless communications device 406 (FIG. 12) may stream the content from user equipment 402 (FIG. 12) over communications path 424 (FIG. 12). Alternatively, if user equipment 402 (FIG. 12) was initially receiving content from a service such as YouTube, or Hulu, wireless communications device may stream the content directly from the service using the longer range link. In step 1710, wireless communications device 406 (FIG. 12) may display the content on wireless communications device 406 (FIG. 12). If the user returns to the room, or if wireless communications device 406 (FIG. 12) is within range of user equipment 402 (FIG. 12), wireless communications device may terminate the longer range link (e.g., Wi-Fi) between wireless communications device 406 (FIG. 12) and user equipment 402 (FIG. 12) and re-establish a connection using the short-range link (e.g., infrared or Bluetooth). Additionally, when wireless communications device 406 comes back within range of user equipment 402, it may automatically instruct user equipment 402 to begin displaying the content that was being displayed on wireless communications device 406. If wireless communications device 406 was previously receiving content from a third party (e.g., YouTube™, Hulu™, etc), wireless communications device may automatically instruct user equipment 402 to begin streaming content from the third party.

In one embodiment, wireless communications device 406 (FIG. 12) may be configured to automatically display not only video, but anything that is being displayed on user equipment 402 (FIG. 12) when wireless communications device 406 (FIG. 12) goes out of range. For example, if the user is browsing program listings, and leaves the room, wireless communications device 406 (FIG. 12) may automatically display the program listings that were displayed on user equipment 402 (FIG. 12). In some embodiments, wireless communications device 406 (FIG. 12) may also automatically adjust it's display resolution so as not to distort what is being displayed (e.g., display text so it is legible). In one embodiment, wireless communications device 406 (FIG. 12) may be configured to allow the user to manually select when to display whatever is being displayed on user equipment 402 (FIG. 12) regardless of whether wireless communications device 406 (FIG. 12) is out of range. For example, even though a user may step away from television 36 (FIG. 14) or set-top box 28 (FIG. 14), wireless communications device 406 (FIG. 14) may still be within range of television 36 (FIG. 14) or set-top box 28 (FIG. 14). Accordingly, the user may manually select (e.g., by "tapping" an on-screen button on the wireless communications device) to start streaming content from set-top box 28 (FIG. 14).

The foregoing is merely illustrative of the principles of this invention and various modifications can be made by those skilled in the art without departing from the scope and spirit of the invention. The above described embodiments of the present invention are presented for purposes of illustration and not of limitation, and the present invention is limited only by the claims which follow.

What is claimed is:

1. A method for automatically transferring media content, the method comprising:
    determining, at a wireless communications device, that the wireless communications device is within range of a short-range link formed between the wireless communications device and user equipment;
    based on the determining that the wireless communications device is within the range of the short-range link, refraining from displaying content on the wireless communications device, wherein the content is displayed on the user equipment;
    determining that the wireless communications device has moved outside of the range of the short-range link;
    based on determining that the wireless communications device has moved outside of the range of the short-range link, automatically receiving, at the wireless communications device, a content stream comprising the content that was displayed on the user equipment when the wireless communications device was within the range of the short-range link, wherein the content stream is received from the user equipment;
    and
    generating for display the content of the content stream on the wireless communications device.

2. The method of claim 1, wherein determining that the wireless communications device has moved outside of the range of the short-range link comprises determining if the short-range link between the user equipment and the wireless communications device is broken.

3. The method of claim 2, further comprising:
    re-establishing the short-range link between the wireless communications device and the user equipment in response to determining that the wireless communications device is within the range of the short-range link.

4. The method of claim 1, wherein determining if the wireless communications device has moved outside of the range of the short-range link comprises using GPS to determine the location of the wireless communications device.

5. A system for automatically transferring media content, system comprising:
    a wireless communications device;
    wherein the wireless communications device is configured to:
        determine, at the wireless communications device, that the wireless communications device is within the range of a short-range link formed between the wireless communications device and user equipment;
        based on the determining that the wireless communications device is within the range of the short-range link, refrain from displaying content on the wireless communications device, wherein the content is displayed on the user equipment;
        determine that the wireless communications device has moved outside of the range of the short-range link;
        based on determining that the wireless communications device has moved outside of the range of the short-range link, automatically receive, at the wireless communications device, a content stream comprising the content that was displayed on the user equipment when the wireless communications device was within the range of the short-range link, wherein the content stream is received from the user equipment;
    and
    generate for display the content of the content stream on the wireless communications device.

6. The system of claim 5, wherein determining that the wireless communications device has moved outside of the range of the short-range link comprises determining if the short-range link between the user equipment and the wireless communications device is broken.

7. The system of claim 6, wherein the wireless communications device is further configured to:
    re-establish the short-range connection link between the wireless communications device and the user equipment in response to determining that the wireless communications device is within the range of the short-range link.

8. The system of claim 5, wherein determining if the wireless communications device has moved outside of the range of the short-range link comprises using GPS to determine the location of the wireless communications device.

9. A non-transitory computer readable media comprising machine readable instructions for:
    determining, at a wireless communications device that the wireless communications device is within range of a short-range link formed between the wireless communications device and user equipment;

based on the determining that the wireless communications device is within the range of the short-range link, refraining from displaying content on the wireless communications device, wherein the content is displayed on the user equipment;

determining that the wireless communications device has moved outside of the range of the short-range link;

based on determining that the wireless communications device has moved outside of the range of the short-range link, automatically receiving, at the wireless communications device, a content stream comprising the content that was displayed on the user equipment when the wireless communications device was within the range of the short-range link, wherein the content stream is received from the user equipment; and generating for display the content of the content stream on the wireless communications device.

10. The computer readable media of claim 9, wherein determining if the wireless communications device has moved outside of the range of the short-range link further comprises machine readable instructions for determining if the short-range link between the user equipment and the wireless communications device is broken.

11. The computer readable media of claim 10, wherein the machine-readable instructions further comprise machine readable instructions for:

re-establishing the short-range link between the wireless communications device and the user equipment in response to determining that the wireless communications device is within the range of the short-range link.

12. The computer readable media of claim 9, wherein determining that the wireless communications device has moved outside of the range of the short-range link further comprises machine readable instructions for using GPS to determine the location of the wireless communications device.

13. The method of claim 1, wherein receiving the content stream comprising the content from the user equipment comprises receiving the content stream over a long-range link that has a range exceeding the short-range link.

14. The system of claim 5, wherein the wireless communications device is further configured to receive the content stream comprising the content from the user equipment via a long-range link that has a range exceeding the short-range link.

15. The non-transitory computer readable media of claim 9, wherein receiving the content stream comprising the content from the user equipment further comprises machine readable instructions for receiving the content stream over a long-range link that has a range exceeding the short-range link.

16. The method of claim 1, wherein the short-range link is at least one of an infrared or Bluetooth link, and wherein automatically receiving, at the wireless communications device, the content stream further comprises receiving the content stream over a Wi-Fi link formed between the user equipment and the wireless communications device.

17. The system of claim 5 wherein the short-range link is at least one of an infrared or Bluetooth link, and wherein the wireless communications device is further configured, when automatically receiving, at the wireless communications device, the content stream, to receive the content stream over a Wi-Fi link formed between the user equipment and the wireless communications device.

18. The computer readable media of claim 9 wherein the short-range link is at least one of an infrared or Bluetooth link, and wherein the instructions for automatically receiving, at the wireless communications device, the content stream further comprise instructions for receiving the content stream over a Wi-Fi link formed between the user equipment and the wireless communications device.

19. The method of claim 1, further comprising:

determining, at the wireless communications device, that the wireless communications device has moved back from being outside of the range of the short-range link into the range of the short-range link; and based on the determining that the wireless communications device has moved back from being outside of the range of the short-range link into the range of the short-range link, terminating the receiving of the content stream at the wireless communications device from the user equipment device, wherein the content that was displayed on the wireless communications device when the wireless communications device was outside of the range of the short-range link is caused to be displayed on the user equipment.

20. The system of claim 5, wherein the wireless communications device is further configured to:

determine, at the wireless communications device, that the wireless communications device has moved back from being outside of the range of the short-range link into the range of the short-range link; and based on the determining that the wireless communications device has moved back from being outside of the range of the short-range link into the range of the short-range link, terminate the receiving of the content stream at the wireless communications device from the user equipment device, wherein the content that was displayed on the wireless communications device when the wireless communications device was outside of the range of the short-range link is caused to be displayed on the user equipment.

21. The non-transitory computer readable media of claim 9, further comprising machine readable instructions for:

determining, at the wireless communications device, that the wireless communications device has moved back from being outside of the range of the short-range link into the range of the short-range link; and based on the determining that the wireless communications device has moved back from being outside of the range of the short-range link into the range of the short-range link, terminating the receiving of the content stream at the wireless communications device from the user equipment device, wherein the content that was displayed on the wireless communications device when the wireless communications device was outside of the range of the short-range link is caused to be displayed on the user equipment.

* * * * *